(12) United States Patent
Gorokhov et al.

(10) Patent No.: US 8,379,583 B2
(45) Date of Patent: Feb. 19, 2013

(54) METHOD AND APPARATUS FOR MULTIPLEXING LEGACY LONG TERM EVOLUTION USER EQUIPMENT WITH ADVANCED LONG TERM EVOLUTION USER EQUIPMENT

(75) Inventors: Alexei Y. Gorokhov, San Diego, CA (US); Amir Farajidana, San Diego, CA (US); Kapil Bhattad, San Diego, CA (US); Ravi Palanki, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 487 days.

(21) Appl. No.: 12/695,571

(22) Filed: Jan. 28, 2010

(65) Prior Publication Data

US 2010/0195600 A1    Aug. 5, 2010

Related U.S. Application Data

(60) Provisional application No. 61/148,813, filed on Jan. 30, 2009, provisional application No. 61/160,659, filed on Mar. 16, 2009.

(51) Int. Cl.
*H04W 4/00* (2009.01)
*H04B 1/00* (2006.01)

(52) U.S. Cl. ........................................ 370/329; 375/135
(58) Field of Classification Search .................... None
See application file for complete search history.

(56) References Cited

U.S. PATENT DOCUMENTS

| | | |
|---|---|---|
| 2008/0187027 A1 | 8/2008 | Malladi |
| 2012/0127939 A1* | 5/2012 | Frederiksen et al. ......... 370/329 |

FOREIGN PATENT DOCUMENTS

| | | |
|---|---|---|
| EP | 2031888 A1 | 3/2009 |
| WO | WO2007148582 | 12/2007 |
| WO | WO2007148583 A1 | 12/2007 |

OTHER PUBLICATIONS

International Search Report/Written Opinion—PCT/US2010/022658—International Search Authority EPO—Apr. 29, 2010.
QUALCOMM Europe: "Principles of Unicast Scheduling for Downlink and Uplink" 3GPP Draft; RI-070439, 3rd Generation Partnership Project (3GPP), Mobile Competence Centre ; 650, Route Des Lucioles ; F-06921 Sophia-Antipolis Cedex ; France, vol. tsg ranWGI_RLITSGRI_47bisDocs, no. Sorrento, Italy; 20070115, Jan. 9, 2007, XP050104470 the whole document.
QUALCOMM Europe: "Principles of Unicast Scheduling for Downlink and Uplink," 3GPP RAN WG1 #47bis, R1-070439, Jan. 10, 2007.
QUALCOMM Europe: "Pseudo-Random Hopping Pattern for PDSCH," 3GPP RAN WG1 #50, R1-073265, Aug. 15, 2007.

(Continued)

*Primary Examiner* — Clemence Han

(57) ABSTRACT

Aspects are disclosed for multiplexing disparate wireless terminals. Resource blocks are mapped according to a hopping pattern. A first and second pair of physical resource blocks are allocated such that the first pair is associated with a first hopping index pair, whereas the second pair is associated with a second hopping index pair. For this embodiment, the first and second hopping index pairs are inversely symmetrical to each other. A pair of distributed resource blocks is also allocated. An assignment is then scheduled that includes a physical resource allocation and a virtual resource allocation. Aspects for operating a wireless terminal are also disclosed. Here, a communication that includes a resource allocation and a reference signal is received. A minimum resource allocation granularity is ascertained from the communication, and a joint channel estimation is based on the reference signal and is a function of the minimum resource allocation granularity.

48 Claims, 16 Drawing Sheets

OTHER PUBLICATIONS

QUALCOMM Europe; "Pseudo-Ramdon Hopping Pattern for PDSCH" 3GPP Draft: R1-073265, 34D Generation Partnership Project (GPP) Mobile. Competence Cetnre 650 Route Des Lucioles, F-06921 Sophia Antipolis Cedex France, vol. RAN WG1, No Athens Greece Aug. 15, 2007.

* cited by examiner

METHOD AND APPARATUS FOR MULTIPLEXING LEGACY LONG TERM EVOLUTION USER EQUIPMENT WITH ADVANCED LONG TERM EVOLUTION USER EQUIPMENT

CROSS-REFERENCE TO RELATED APPLICATIONS

This application claims the benefit of U.S. Provisional Patent application Ser. No. 61/148,813 entitled "Method and Apparatus to Multiplex Different LTE and LTE-A User Equipment (UEs) With Applications to Dedicated Reference Signal Design," which was filed Jan. 30, 2009, and U.S. Provisional Patent application Ser. No. 61/160,659 entitled "Method and Apparatus to Multiplex Different LTE and LTE-A User Equipment (UEs) With Applications to Dedicated Reference Signal Design," which was filed Mar. 16, 2009. The aforementioned applications are herein incorporated by reference in their entirety.

BACKGROUND

I. Field

The following description relates generally to wireless communications, and more particularly to methods and apparatuses for facilitating multiplexing disparate wireless terminals.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_s$ independent channels, which are also referred to as spatial channels, where $N_s \leq \min\{N_T, N_R\}$. Each of the $N_s$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Recent developments in LTE technology have contributed to the release of more sophisticated wireless terminals. For instance, advanced LTE (LTE-A) wireless terminals may implement techniques unavailable in legacy LTE wireless terminals, including cooperative multipoint transmission, interference management, and/or higher order MIMO operation. However, allocating resources to LTE legacy and LTE-A users needs to be done in a way that minimizes the impact on the performance of legacy LTE users while enabling efficient operation of advanced techniques defined for LTE-A users. Accordingly, it would be desirable to develop a method and apparatus for efficiently allocating resources to LTE-A users and legacy LTE users simultaneously.

The above-described deficiencies of current wireless communication systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with allocating and scheduling resources for disparate wireless terminals. In one aspect, methods and computer program products are disclosed for facilitating multiplexing disparate wireless terminals. Within such embodiments, resource blocks are mapped in a sub-frame according to a hopping pattern. The sub-frame includes a first set of resource blocks in a first slot and second set of resource blocks in a second slot such that each of the first set of resource blocks has a hopping index associated with a corresponding hopping index in the second set of resource blocks. Each of a first pair of physical resource blocks and a second pair of physical resource blocks are then allocated according to a physical resource allocation. The first pair of physical resource blocks are associated with a first hopping index pair, whereas the second pair of physical resource blocks are associated with a second hopping index pair. For this embodiment, the first hopping index pair is inversely symmetrical with the second hopping index pair. A pair of distributed resource blocks are also allocated according to a virtual resource allocation associated with the hopping pattern. Here, the pair of distributed resource blocks is different than each of the first pair of physical resource blocks and the second pair of physical resource blocks. An assignment is then scheduled, which includes assigning each of the first pair of physical resource blocks and the second pair of physical resource blocks according to the physical resource allocation, and assigning the pair of distributed resource blocks according to the virtual resource allocation.

In another aspect, an apparatus for facilitating multiplexing disparate wireless terminals is disclosed. Within such embodiment, the apparatus includes a processor configured to execute computer executable components stored in memory. The computer executable components include a mapping component, a physical allocation component, a virtual allocation component, and a scheduling component. The mapping component is configured to map resource blocks in a sub-frame according to a hopping pattern. Here, the sub-frame includes a first set of resource blocks in a first slot and second set of resource blocks in a second slot. Each of the first set of resource blocks has a hopping index associated with a corresponding hopping index in the second set of resource blocks. The physical allocation component is configured to perform a physical allocation of each of a first pair of physical resource blocks and a second pair of physical resource blocks according to a physical resource allocation. The first pair of physical resource blocks is associated with a first hopping index pair, whereas the second pair of physical resource blocks is associated with a second hopping index pair. For this embodiment, the first hopping index pair is inversely symmetrical with the second hopping index pair. The virtual allocation component is configured to perform a virtual allocation of a pair of distributed resource blocks according to a virtual resource allocation associated with the hopping pattern. The pair of distributed resource blocks is different than each of the first pair of physical resource blocks and the second pair of physical resource blocks. The scheduling component is configured to schedule an assignment that assigns each of the first pair of physical resource blocks and the second pair of physical resource blocks according to the physical resource allocation. The assignment also assigns the pair of distributed resource blocks according to the virtual resource allocation.

In a further aspect, another apparatus is disclosed. Within such embodiment, the apparatus includes means for mapping resource blocks, means for physically allocating, means for virtually allocating, and means for scheduling an assignment. For this embodiment, resource blocks are mapped in a sub-frame according to a hopping pattern. The sub-frame includes a first set of resource blocks in a first slot and second set of resource blocks in a second slot such that each of the first set of resource blocks has a hopping index associated with a corresponding hopping index in the second set of resource blocks. Each of a first pair of physical resource blocks and a second pair of physical resource blocks are then physically allocated according to a physical resource allocation. The first pair of physical resource blocks are associated with a first hopping index pair, whereas the second pair of physical resource blocks are associated with a second hopping index pair. For this embodiment, the first hopping index pair is inversely symmetrical with the second hopping index pair. A pair of distributed resource blocks are also allocated according to a virtual resource allocation associated with the hopping pattern. Here, the pair of distributed resource blocks is different than each of the first pair of physical resource blocks and the second pair of physical resource blocks. An assignment is then scheduled, which includes assigning each of the first pair of physical resource blocks and the second pair of physical resource blocks according to the physical resource allocation, and assigning the pair of distributed resource blocks according to the virtual resource allocation.

In a further aspect, methods and computer program products are disclosed for facilitating operation of a wireless terminal according to a multiplexed scheduling of disparate wireless terminals. Within such embodiments, a communication that includes a resource allocation and a reference signal is received from a base station. A minimum resource allocation granularity associated with the resource allocation is ascertained from the communication. A joint channel estimation is then performed based on the reference signal and as a function of the minimum resource allocation granularity.

An apparatus for facilitating operation of a wireless terminal according to a multiplexed scheduling of disparate wireless terminals is also disclosed. Within such embodiment, the apparatus includes a processor configured to execute computer executable components stored in memory. The computer executable components include a communication component, a granularity component, and an estimation component. The communication component is configured to receive a communication from a base station, which includes a resource allocation and a reference signal. The granularity component is configured to ascertain a minimum resource allocation granularity associated with the resource allocation from the communication. The estimation component is configured to perform a joint channel estimation based on the reference signal and as a function of the minimum resource allocation granularity.

In a further aspect, another apparatus is disclosed. Within such embodiment, the apparatus includes means for receiving a communication, means for ascertaining a minimum resource allocation granularity, and means for performing a joint channel estimation. For this embodiment, a communication that includes a resource allocation and a reference signal is received from a base station. A minimum resource allocation granularity associated with the resource allocation is ascertained from the communication. A joint channel estimation is then performed based on the reference signal and as a function of the minimum resource allocation granularity.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
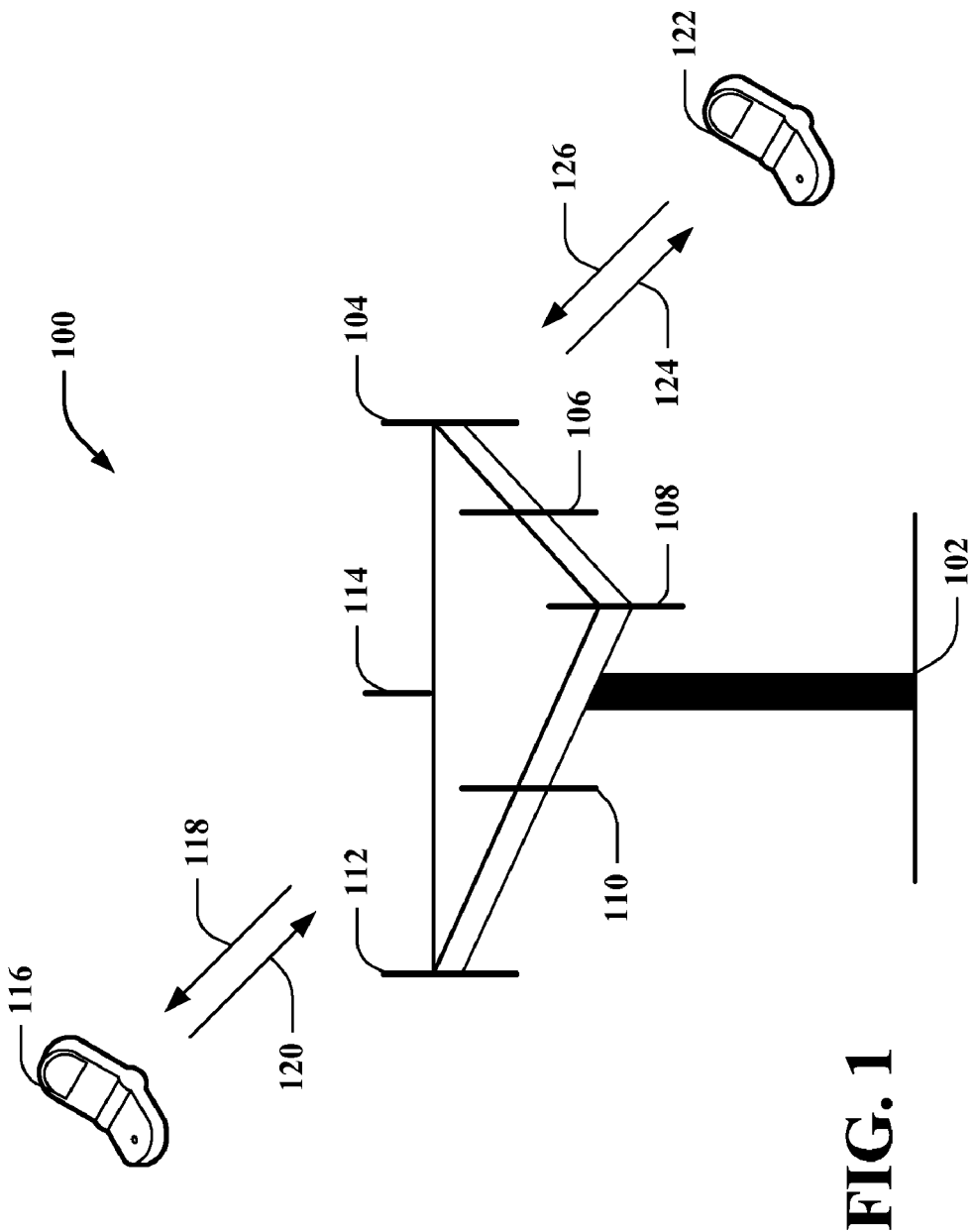
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

The subject specification discloses a method and apparatus that facilitates an efficient allocation and scheduling of disparate wireless terminals. In an aspect, the subject specification discloses simultaneously scheduling legacy UEs (and LTE-A UEs) in hopping mode and non-legacy UEs in non-hopping mode. Alternatively, the proposal can be viewed as a way of multiplexing UEs that are allocated resources in hopping mode and employ transmission modes that depend on a common reference signal (CRS) and UEs with transmission modes that (are based on or) make use of a dedicated reference signal (DRS) and are allocated resources in the non-hopping mode. Here, one of ordinary skill in the art will appreciate that the term "user equipment reference signal" (UE-RS) is sometimes used to refer to "dedicated pilots" in Release9+ which have been designed for localized hopping (LVRB) which employ physical resource block allocation, whereas "dedicated reference signals" are defined in Release8 and, similar to CRS, have been designed to operate with either distributed hopping (DVRB) or localized hopping (LVRB). Nevertheless, as used herein, the term "dedicated reference signal" is sometimes interchangeable with the term "user equipment reference signal".

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA), High Speed Packet Access (HSPA), and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

High speed packet access (HSPA) can include high speed downlink packet access (HSDPA) technology and high speed uplink packet access (HSUPA) or enhanced uplink (EUL) technology and can also include HSPA+ technology. HSDPA, HSUPA and HSPA+ are part of the Third Generation Partnership Project (3GPP) specifications Release 5, Release 6, and Release 7, respectively.

High speed downlink packet access (HSDPA) optimizes data transmission from the network to the user equipment (UE). As used herein, transmission from the network to the user equipment UE can be referred to as the "downlink" (DL). Transmission methods can allow data rates of several Mbits/s. High speed downlink packet access (HSDPA) can increase the capacity of mobile radio networks. High speed uplink packet access (HSUPA) can optimize data transmission from the terminal to the network. As used herein, transmissions from the terminal to the network can be referred to as the "uplink" (UL). Uplink data transmission methods can allow data rates of several Mbit/s. HSPA+ provides even further improvements both in the uplink and downlink as specified in Release 7 of the 3GPP specification. High speed packet access (HSPA) methods typically allow for faster interactions between the downlink and the uplink in data services transmitting large volumes of data, for instance Voice over IP (VoIP), videoconferencing and mobile office applications Fast data transmission protocols such as hybrid automatic repeat request, (HARQ) can be used on the uplink and downlink. Such protocols, such as hybrid automatic repeat request (HARQ), allow a recipient to automatically request retransmission of a packet that might have been received in error.

Various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL)

station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Figure 2:
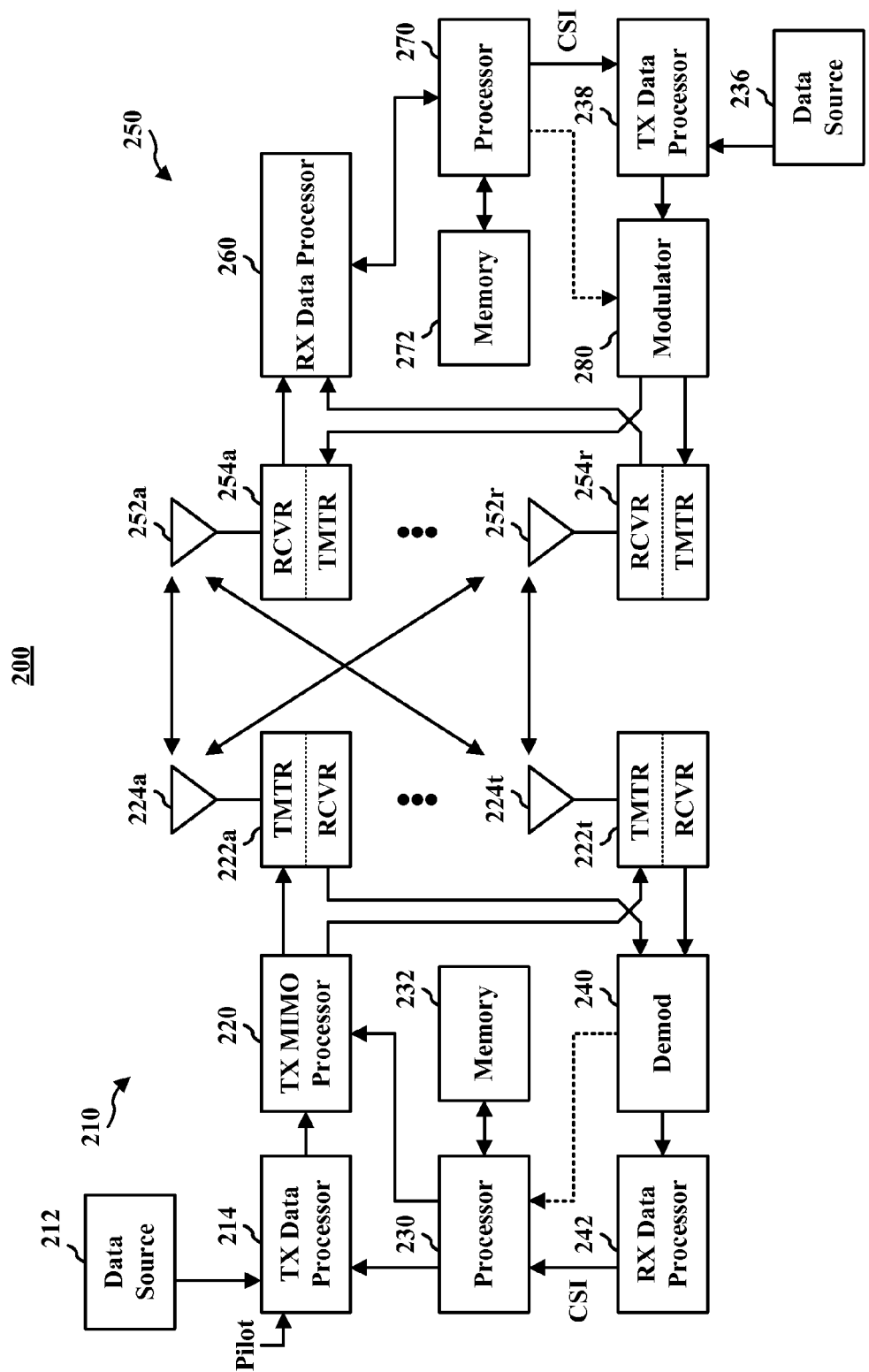
FIG. 2 is an illustration of an exemplary wireless network environment that can be employed in conjunction with the various systems and methods described herein.

FIG. 2 shows an example wireless communication system 200. The wireless communication system 200 depicts one base station 210 and one access terminal 250 for sake of brevity. However, it is to be appreciated that system 200 can include more than one base station and/or more than one access terminal, wherein additional base stations and/or access terminals can be substantially similar or different from example base station 210 and access terminal 250 described below. In addition, it is to be appreciated that base station 210 and/or access terminal 250 can employ the systems and/or methods described herein to facilitate wireless communication there between.

At base station 210, traffic data for a number of data streams is provided from a data source 212 to a transmit (TX) data processor 214. According to an example, each data stream can be transmitted over a respective antenna. TX data processor 214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 230.

The modulation symbols for the data streams can be provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In various embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 222a through 222t are transmitted from $N_T$ antennas 224a through 224t, respectively.

At access terminal 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective signal, digitizes the conditioned signal to provide samples, and further processes the samples to provide a corresponding "received" symbol stream.

An RX data processor 260 can receive and process the $N_R$ received symbol streams from $N_R$ receivers 254 based on a particular receiver processing technique to provide $N_T$ "detected" symbol streams. RX data processor 260 can demodulate, deinterleave, and decode each detected symbol stream to recover the traffic data for the data stream. The processing by RX data processor 260 is complementary to that performed by TX MIMO processor 220 and TX data processor 214 at base station 210.

A processor 270 can periodically determine which available technology to utilize as discussed above. Further, processor 270 can formulate a reverse link message comprising a matrix index portion and a rank value portion.

The reverse link message can comprise various types of information regarding the communication link and/or the received data stream. The reverse link message can be processed by a TX data processor 238, which also receives traffic data for a number of data streams from a data source 236, modulated by a modulator 280, conditioned by transmitters 254a through 254r, and transmitted back to base station 210.

At base station 210, the modulated signals from access terminal 250 are received by antennas 224, conditioned by receivers 222, demodulated by a demodulator 240, and processed by a RX data processor 242 to extract the reverse link message transmitted by access terminal 250. Further, processor 230 can process the extracted message to determine which precoding matrix to use for determining the beamforming weights.

Processors 230 and 270 can direct (e.g., control, coordinate, manage, etc.) operation at base station 210 and access terminal 250, respectively. Respective processors 230 and 270 can be associated with memory 232 and 272 that store program codes and data. Processors 230 and 270 can also perform computations to derive frequency and impulse response estimates for the uplink and downlink, respectively.

Figure 3:
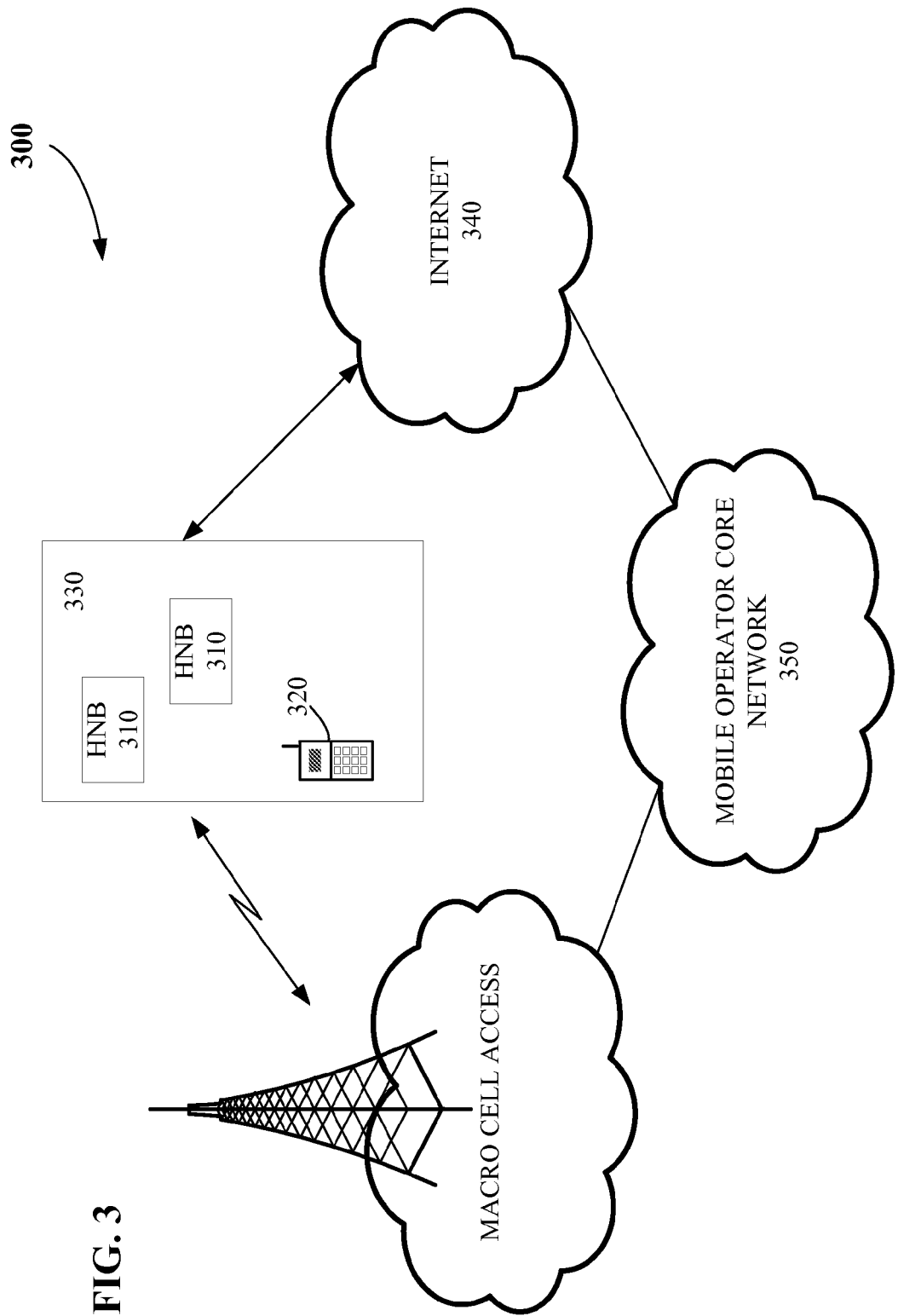
FIG. 3 illustrates an exemplary communication system that enables deployment of access point base stations within a network environment.

FIG. 3 illustrates an exemplary communication system to enable deployment of access point base stations within a network environment. As shown in FIG. 3, the system 300 includes multiple access point base stations or, in the alternative, femto cells, Home Node B units (HNBs), or Home evolved Node B units (HeNBs), such as, for example, HNBs 310, each being installed in a corresponding small scale network environment, such as, for example, in one or more user residences 330, and being configured to serve associated, as well as alien, user equipment (UE) or mobile stations 320. Each HNB 310 is further coupled to the Internet 340 and a mobile operator core network 350 via a DSL router (not shown) or, alternatively, a cable modem (not shown).

Figure 4:
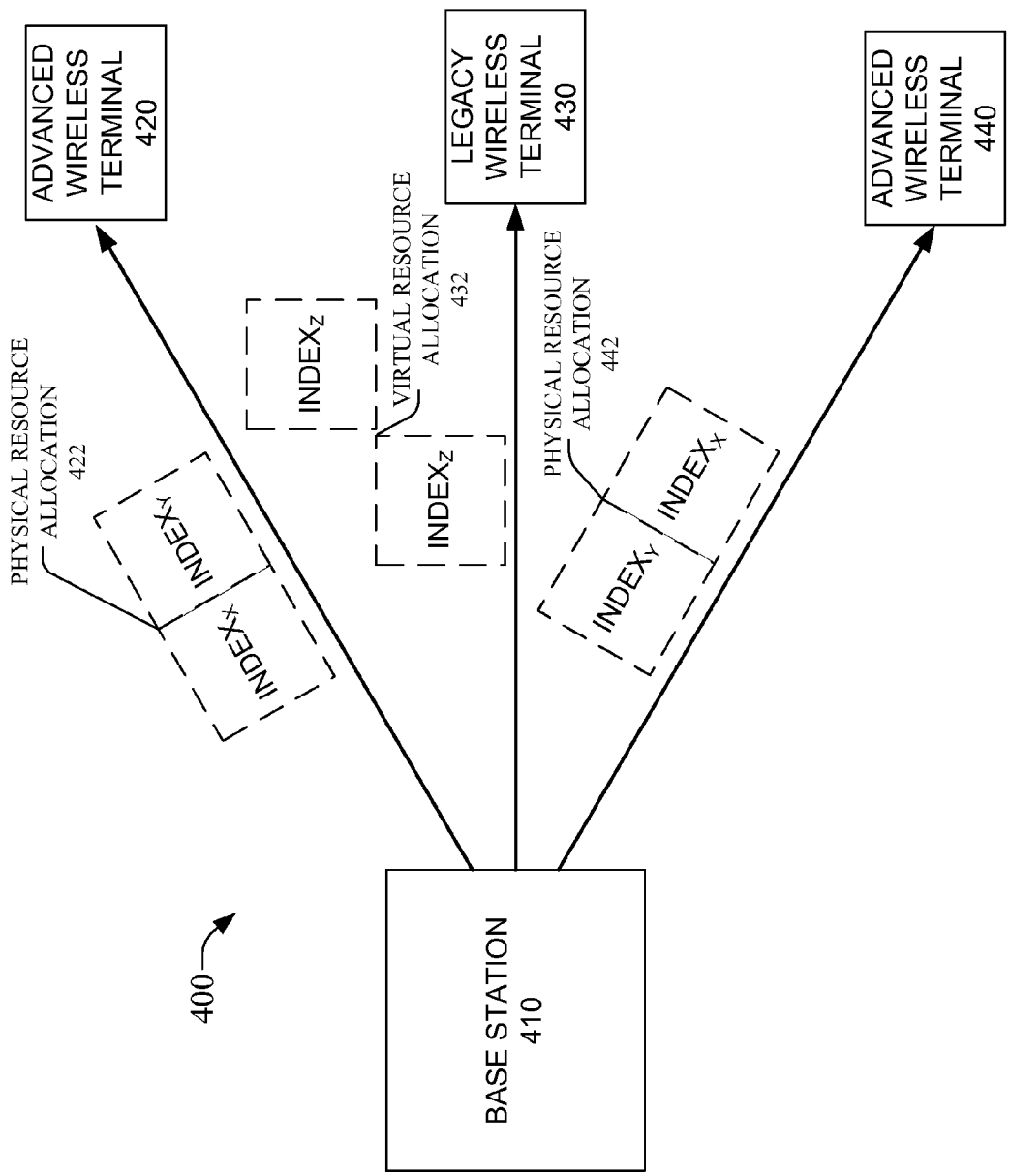
FIG. 4 is an overview of an exemplary system for multiplexing disparate wireless terminals in accordance with an aspect of the subject specification.

Referring next to FIG. 4, an overview of an exemplary system for multiplexing disparate wireless terminals in accordance with an aspect of the subject specification is provided. As illustrated, system 400 includes base station 410 communicatively coupled to each of advanced wireless terminal 420, legacy wireless terminal 430, and advanced wireless terminal 440. In an aspect, each of advanced wireless terminal 420 and advanced wireless terminal 440 are LTE-A wireless terminals, whereas legacy wireless terminal 430 is a legacy LTE wireless terminal. For this particular embodiment, base station 410 efficiently allocates resources by exploiting the specific resource allocation and assignment structure of LTE Release 8. Moreover, base station 410 exploits the symmetry of hopping patterns within the resource allocation and assignment structure of LTE Release 8 to facilitate efficient operation of the LTE-A advanced system in a legacy compatible manner. Here, although the resource assignment to a legacy UE can be based on physical resource allocation (referred to as non-hopping mode) or distributed virtual resource allocation (referred to as hopping mode), legacy wireless terminal 430 is assigned virtual resource allocation 432 for this particular embodiment. As illustrated, for a particular two-slot sub-frame, advanced wireless terminal 420 is then assigned physical resource allocation 422 while advanced wireless terminal 440 is assigned physical resource allocation 424, wherein the pair of hopping pattern indices associated with advanced wireless terminal 420 (i.e., $INDEX_X$-$INDEX_Y$) is inversely symmetrical to the pair of hopping pattern indices associated with advanced wireless terminal 440 (i.e., $INDEX_Y$-$INDEX_X$).

Figure 5:
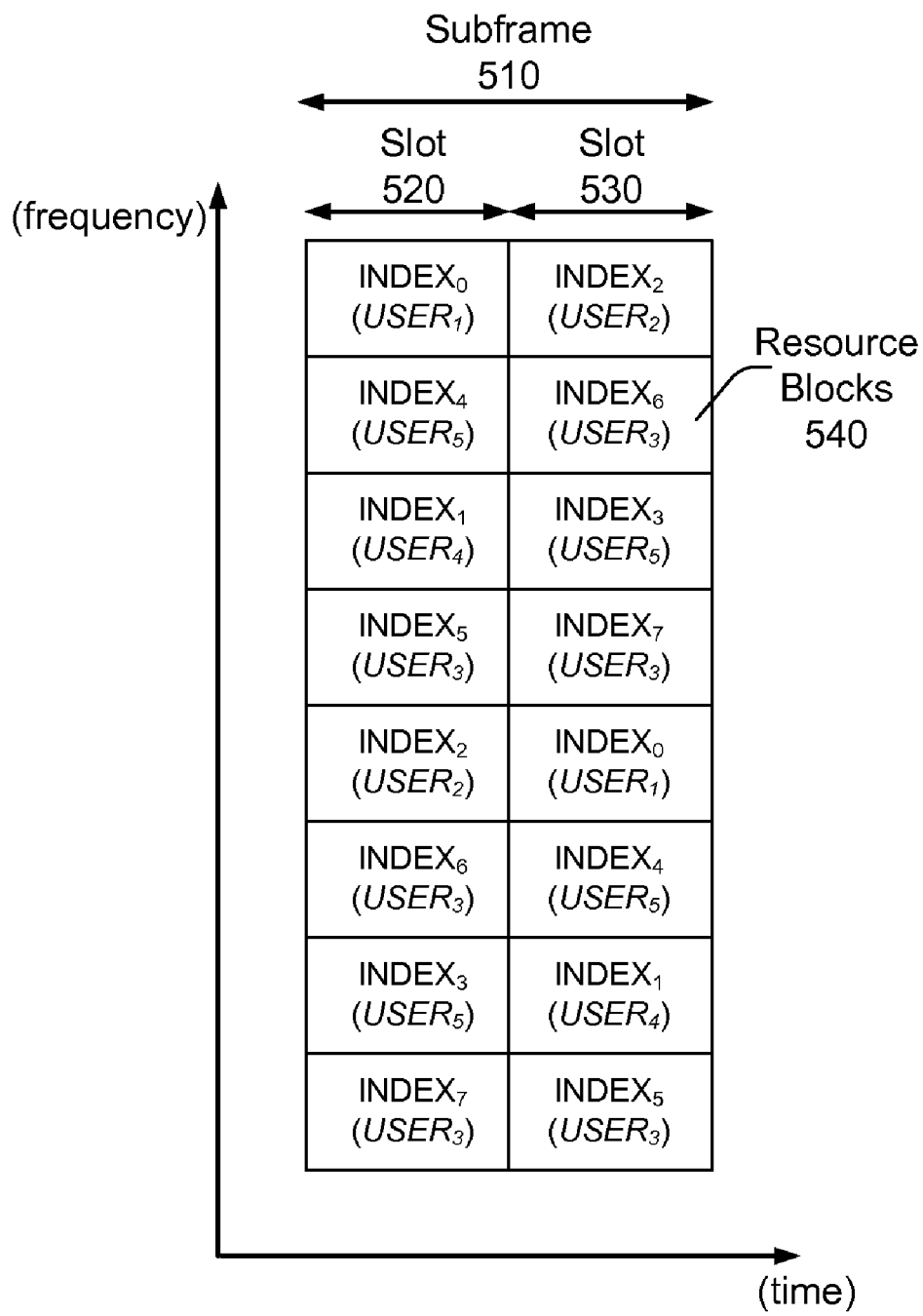
FIG. 5 illustrates an exemplary resource allocation and assignment structure in accordance with a first aspect of the subject specification.

Referring next to FIG. 5, an exemplary resource allocation and assignment structure is provided in accordance with a first aspect of the subject specification. As illustrated, FIG. 5 depicts a hopping mapping defined for a system with eight resource blocks 540 defined in the downlink, wherein sub-frame 510 includes slot 520 and slot 530. For this embodiment, a distributed resource block index is mapped to each of resource blocks 540 according to a particular hopping pattern, wherein resource blocks 540 are respectively allocated in hopping mode to $USER_1$, $USER_2$, $USER_3$, $USER_4$, and $USER_5$. For this example, it is assumed that $USER_5$ is an LTE-A user, whereas each of $USER_1$, $USER_2$, $USER_3$, and $USER_4$ are legacy LTE users.

Here, it should be noted that hopping across slot 520 and slot 530 within sub-frame 510 has particular characteristics in LTE Release 8. For instance, the hopping map is common and the same across all the cells in the system. Furthermore, such hopping is between pairs of resource blocks 540 and is defined in a symmetric way between slot 520 and slot 530. Namely, if resource block X in slot 520 hops to resource block Y in slot 530, then resource block Y in slot 520 hops to resource block X in slot 530. In FIG. 5, for example, the distributed resource blocks associated with indices zero and two are paired together in the two slots as $INDEX_0$-$INDEX_2$ and $INDEX_2$-$INDEX_0$.

In an aspect, the symmetry property of the hopping is used to schedule LTE-A wireless terminals in resource blocks that span an entire sub-frame and do not hop across slot boundaries. By exploiting this symmetry in such a manner, the scheduling of these LTE-A wireless terminals does not affect legacy LTE wireless terminals scheduled according to a distributed resource allocation. This can be ensured by allocating non-hopping mode resource blocks to LTE-A wireless terminals from a set of pairs of physical resource blocks, each pair corresponding to a pair of distributed resource blocks defined in the hopping mode.

Figure 6:
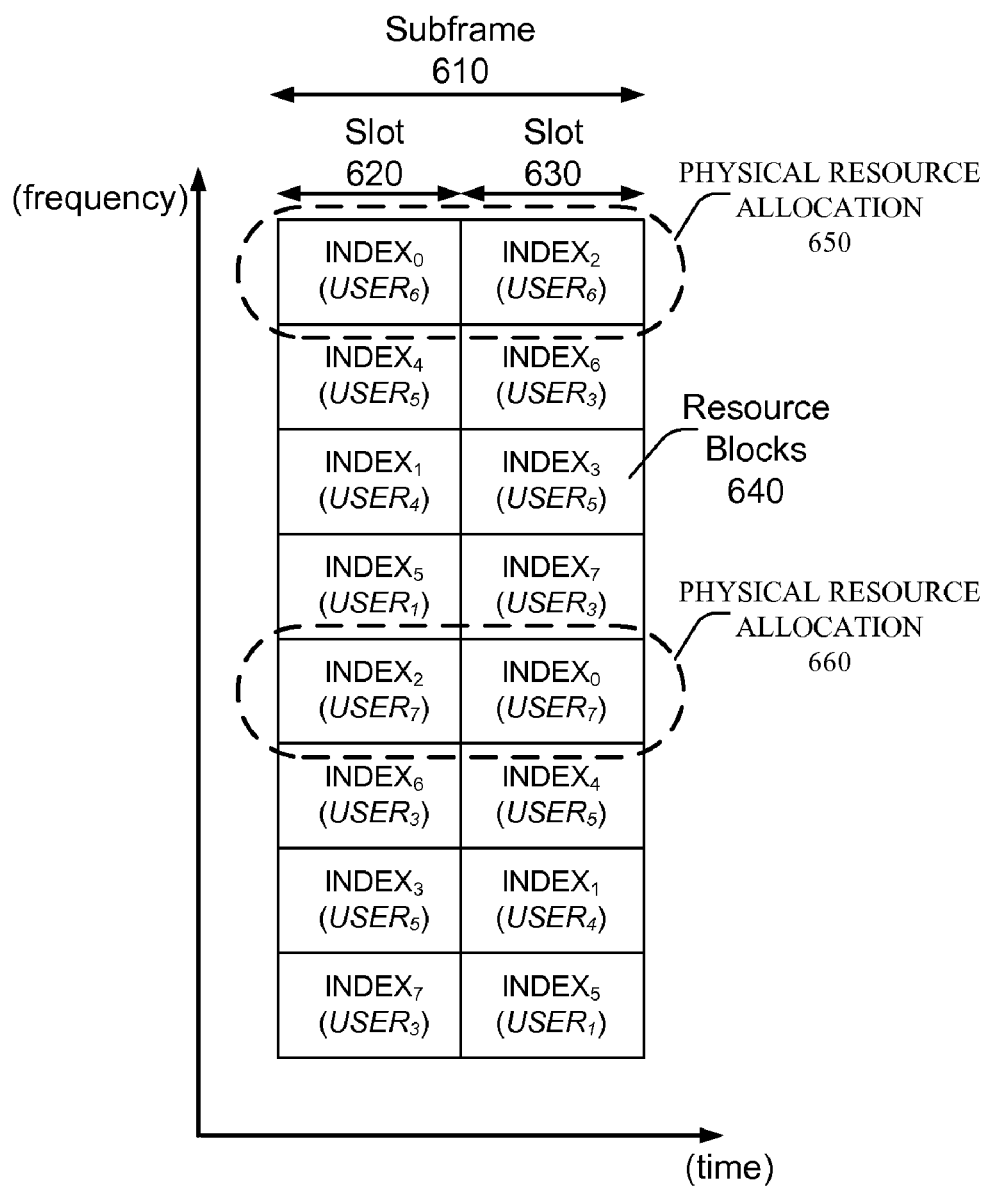
FIG. 6 illustrates an exemplary resource allocation and assignment structure in accordance with a second aspect of the subject specification.

For instance, as illustrated in FIG. 6, eight resource blocks 640 are again defined in the downlink, wherein sub-frame 610 includes slot 620 and slot 630. In this embodiment, a distributed resource block index is mapped to each of resource blocks 640 according to the same hopping pattern as FIG. 5. Here, in addition to respectively allocating distributed resource blocks in hopping mode to $USER_1$, $USER_2$, $USER_3$, $USER_4$, and $USER_5$, physical resource blocks are also allocated for $USER_6$ and $USER_7$ according to physical resource allocation 650 and physical resource allocation 660, respectively. For this example, it is assumed that each of $USER_5$, $USER_6$, and $USER_7$ are LTE-A users, whereas each of $USER_1$, $USER_2$, $USER_3$, and $USER_4$ are legacy LTE users. As illustrated, $USER_6$ and $USER_7$ can be assigned each one contiguous resource block in the non-hopping mode without affecting the distributed allocations for $USER_1$, $USER_2$, $USER_3$, $USER_4$, or $USER_5$. This is carried out by reserving the pair of physical resource blocks corresponding to hopping indices zero and two, and subsequently assigning the reserved pair of physical resource blocks to $USER_6$ and $USER_7$, respectively.

Among other benefits, this methodology enables the design of reference signals for new LTE-A techniques including, for example, multiuser-MIMO, higher order MIMO, cooperative multi-point transmission, and interference management that potentially benefit from scheduling LTE-A wireless terminals on resource blocks spanning the entire sub-frame. An exemplary applicable scenario is in the context of a Dedicated Reference Signal (DRS) and/or User Equipment Reference Signal (UE-RS) for these advanced techniques. Dedicated reference signals and user equipment reference signals provide UEs with a local channel estimate among the resources assigned to the UE. The overhead (in terms of number of pilots) required for an acceptable local channel estimate will increase with reducing the allocated block size. Thus scheduling LTE-A UEs in the hopping mode with distributed resource blocks, which only span one slot (i.e., approximately 0.5 ms), requires a much larger overhead (in terms of the number of pilots) for acceptable channel estimation than the case where the resource block spans the entire sub-frame (i.e., a non-hopping mode resource block).

In an aspect, for UEs that benefit from the diversity gain provided by hopping mode allocation (e.g. high mobility UEs, UEs with outage requirements, etc.), a common resource signal (CRS) based channel estimation can be used instead. Namely, by exploiting the specific structure of the hopping mapping in Release 8 as discussed above, it is possible to multiplex UEs operating in a DRS-based transmission mode according to a physical resource allocation with UEs operating in a CRS-based transmission mode according to a virtual resource allocation.

In another aspect, the commonality of the hopping pattern across all the cells can be used by the cells (or eNode-Bs) participating in cooperative schemes. This ensures that LTE-A UE(s) can be allocated the same resource blocks across the cells, while supporting distributed resource block assignments for legacy UEs. In particular, this can be useful in the design of dedicated reference signal designs for channel estimation at demodulation for multipoint cooperative schemes. It can also allow for joint LTE-A UE scheduling across multiple cells in distributed beam-forming or inter-cell interference management.

It should be further noted that similar techniques can be generally applicable to separating UEs of different releases in future systems (including LTE). In one embodiment, the time-frequency resources used by a set of legacy UEs may be restricted (for example, via restricting scheduling to a few virtual resource blocks or physical resource blocks). This restriction could be advertised to the non-legacy UEs over L3 signaling, for instance. The non-legacy UEs could then have the hopping pattern restricted to the remaining UEs.

Figure 7:
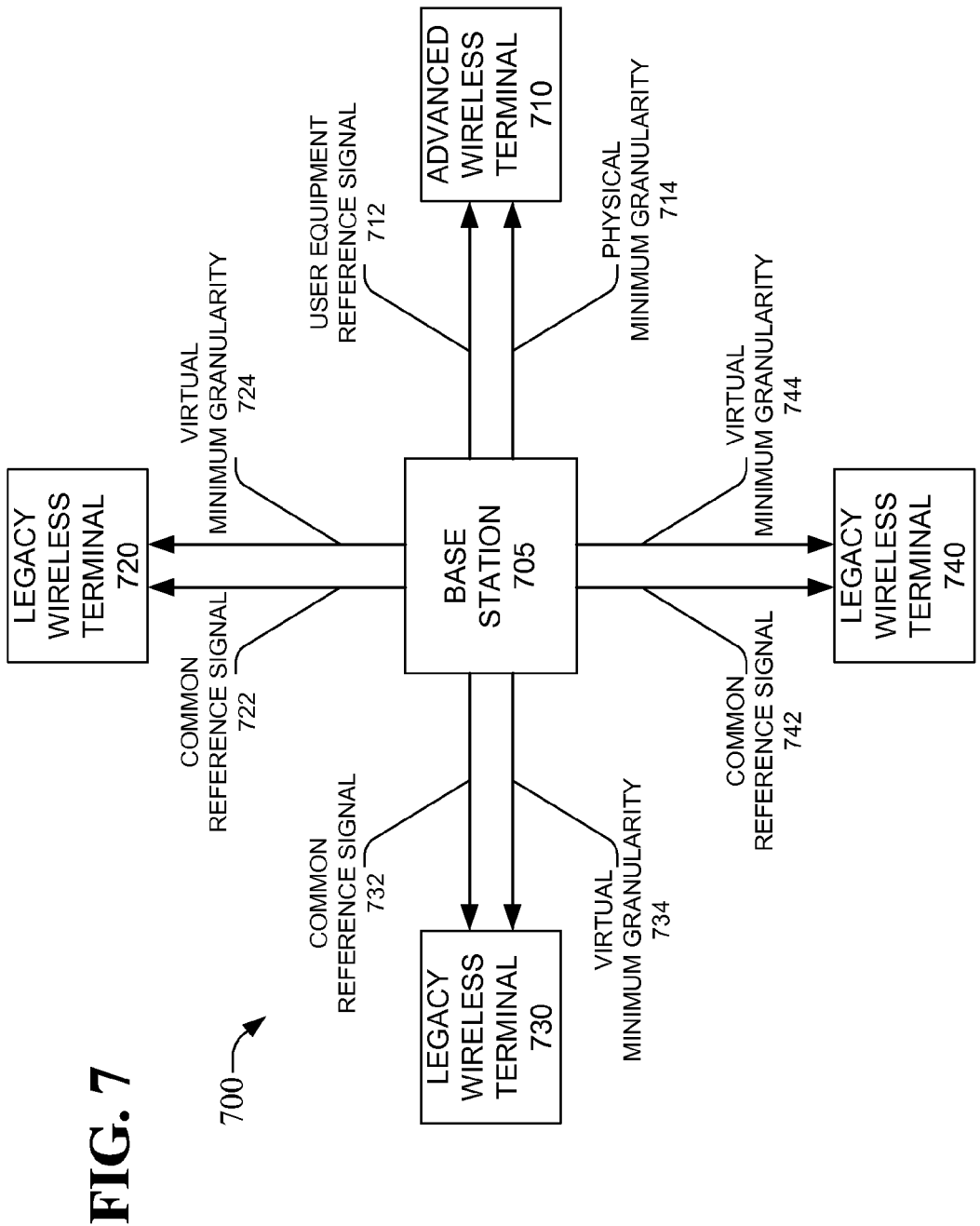
FIG. 7 is an overview of an exemplary system for providing disparate wireless terminals with minimum resource allocation granularities in accordance with an aspect of the subject specification.

Referring next to FIG. 7 an overview of an exemplary system for providing disparate wireless terminals with minimum resource allocation granularities is provided. As illustrated, system 700 includes base station 705 communicatively coupled to advanced wireless terminal 710, legacy wireless terminal 720, legacy wireless terminal 730, and legacy wireless terminal 740. For this particular example, it is assumed that advanced wireless terminal 710 is an LTE-A UE, whereas each of legacy wireless terminal 720, legacy wireless terminal 730, and legacy wireless terminal 740 are legacy LTE wireless terminals. Within such embodiment, it is possible to define a minimum resource allocation granularity to LTE-A UEs that is different than the granularity for legacy LTE UEs, wherein a different type of reference signal is also used. Specifically, as illustrated, base station 705 provides advanced wireless terminal 710 with user equipment reference signal 712 and physical minimum granularity 714, whereas legacy wireless terminal 720 is provided with common reference signal 722 and virtual minimum granularity 724, legacy wireless terminal 730 is provided with common reference signal 732 and virtual minimum granularity 734, and legacy wireless terminal 740 is provided with common reference signal 742 and virtual minimum granularity 744.

It should be further noted that granularities can be defined in either a frequency domain or a time domain, separately and/or jointly. The granularity of assignment in time or frequency, can be explicitly signaled to the UE (in DL grant, or with L2 or L3 signaling), or can be based on some pre-defined rule or a combination thereof. Furthermore, the signaling of the resource allocated to the UE can take the minimum granularity defined for the UE into account.

For minimum granularities defined in the frequency domain, the minimum granularity can be for instance a multiple of the physical resource block granularity defined in a legacy system. Furthermore, this minimum granularity can depend on the mode of transmission to that UE and possibly other multiplexed UEs in the system and can be configured. For instance it can depend on the rank of transmission, the type of reference signal used by the UE for channel estimation, and/or a particular DRS pattern in use. As an example it is possible to define the minimum granularity of UEs with a large rank of transmission (i.e, Rank>Threshold) as N contiguous legacy physical resource blocks (each spanning the entire sub-frame). Specific resource mapping in hopping and non-hopping mode of LTE legacy systems can then be used by the scheduler to make these types of allocations to LTE-A UEs possible in a legacy compatible manner.

The minimum resource allocation granularity for LTE-A UEs can also be defined in the time domain spanning more than one sub-frame. In this case, the eNodeB can perform scheduling in such a way that the same sets of physical resource blocks in a number of contiguous sub-frames are assigned to the specific LTE-A UE or UEs. The asynchronous HARQ operation in the downlink of LTE Release 8 and LTE-A can facilitate the eNodeB in such scheduling. The minimum granularity in time can be configurable and can depend on the system, UE properties, and scheduling decision such as rank of transmission, the type of reference signal used (e.g., DRS versus CRS) and a particular DRS pattern in use.

In an aspect, the UE can use the knowledge of the allocation granularity to perform joint channel estimation based on the reference signals within the sub-frames assigned to this UE. The NodeB can make sure that the transmitted reference signals are applicable over the granularity defined. Furthermore, data packet encoding for the UEs may be done per sub-frame or a smaller set of assigned sub-frames so as to guarantee independent de-codability of packets within each sub-frame (or subset of sub-frames).

Figure 8:
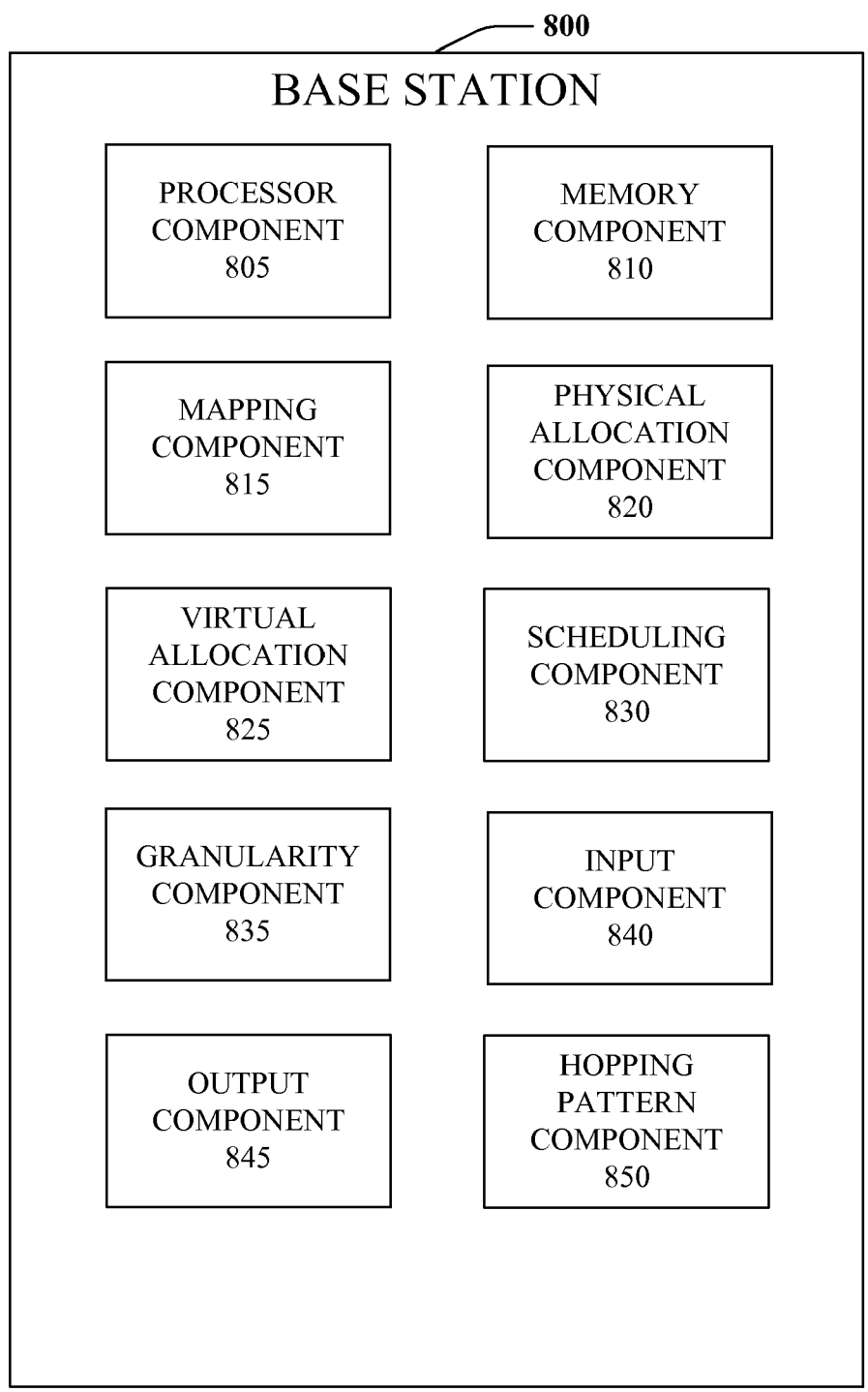
FIG. 8 illustrates a block diagram of an exemplary base station that facilitates multiplexing disparate wireless terminals in accordance with an aspect of the subject specification.

Referring next to FIG. 8, a block diagram of an exemplary base station that facilitates multiplexing disparate wireless terminals according to an embodiment is provided. As shown, base station 800 may include processor component 805, memory component 810, mapping component 815, physical allocation component 820, virtual allocation component 825, scheduling component 830, granularity component 835, input component 840, output component 845, and hopping pattern component 850.

In one aspect, processor component 805 is configured to execute computer-readable instructions related to performing any of a plurality of functions. Processor component 805 can be a single processor or a plurality of processors dedicated to analyzing information to be communicated from base station 800 and/or generating information that can be utilized by memory component 810, mapping component 815, physical allocation component 820, virtual allocation component 825, scheduling component 830, granularity component 835, input component 840, output component 845, and/or hopping pattern component 850. Additionally or alternatively, processor component 805 may be configured to control one or more components base station 800.

In another aspect, memory component 810 is coupled to processor component 805 and configured to store computer-readable instructions executed by processor component 805.

Memory component 810 may also be configured to store any of a plurality of other types of data including data generated by any of mapping component 815, physical allocation component 820, virtual allocation component 825, scheduling component 830, granularity component 835, input component 840, output component 845, and/or hopping pattern component 850. Memory component 810 can be configured in a number of different configurations, including as random access memory, battery-backed memory, hard disk, magnetic tape, etc. Various features can also be implemented upon memory component 810, such as compression and automatic back up (e.g., use of a Redundant Array of Independent Drives configuration).

As illustrated, base station 800 also includes mapping component 815, which is configured to map resource blocks in a sub-frame according to a hopping pattern. For this embodiment, the sub-frame includes a first set of resource blocks in a first slot and second set of resource blocks in a second slot, wherein each of the first set of resource blocks has a hopping index associated with a corresponding hopping index in the second set of resource blocks.

In another aspect, base station 800 includes physical allocation component 820. Here, physical allocation component 820 is configured to allocate each of a first pair of physical resource blocks and a second pair of physical resource blocks according to a physical resource allocation. For this embodiment, the first pair of physical resource blocks is associated with a first hopping index pair, whereas the second pair of physical resource blocks is associated with a second hopping index pair. In an aspect, the first hopping index pair is inversely symmetrical with the second hopping index pair.

Base station 800 may further include virtual allocation component 825, which is configured to allocate distributed resource blocks. In an aspect, the distributed resource blocks are allocated according to a virtual resource allocation associated with the hopping pattern utilized by mapping component 815. For this embodiment, the distributed resource blocks include at least one pair of resource blocks different than each of the first and second pairs of physical resource blocks.

As illustrated, base station 800 also includes scheduling component 830. In an aspect, scheduling component 830 is configured to schedule an assignment that assigns each of the first pair of physical resource blocks and the second pair of physical resource blocks according to the physical resource allocation. The assignment also assigns the at least one pair of distributed resource blocks according to the virtual resource allocation.

In a further aspect, base station 800 includes granularity component 835, which is configured to define a minimum resource allocation granularity. For this embodiment, granularity component 835 may be configured to define a first minimum resource allocation granularity corresponding to a first set of wireless terminals, as well as a second minimum resource allocation granularity different than the first minimum resource allocation granularity and corresponding to a second set of wireless terminals different than the first set of wireless terminals. Here, it should be noted that granularity component 835 may be configured to define a minimum resource allocation granularity in any of a plurality of ways. For instance, granularity component 835 may be configured to define a minimum resource allocation granularity in either of a time domain or frequency domain, separately and/or jointly. Granularity component 835 may also be configured to define the minimum resource allocation granularity as a function of a rank of transmission, a pre-defined physical resource block granularity, a type of reference signal, and/or a user equipment reference signal pattern.

In another aspect, input component 840 and output component 845 are coupled to processor component 805 and configured to interface base station 800 with external entities. For instance, input component 840 may be configured to receive identifying indicia to facilitate identifying wireless terminals.

In a particular embodiment, input component 840 is configured to receive a first identifying indicia to facilitate identifying a first wireless terminal as utilizing a user equipment reference signal, as well as a second identifying indicia to facilitate identifying a second wireless terminal as utilizing a common reference signal. For this embodiment, scheduling component 830 is configured to assign at least one of the first pair of physical resource blocks or the second pair of physical resource blocks to the first wireless terminal, and the at least one pair of distributed resource blocks to the second wireless terminal.

In another embodiment, input component 840 is configured to receive a first identifying indicia to facilitate identifying a first wireless terminal associated with a first long term evolution release, as well as a second identifying indicia to facilitate identifying a second wireless terminal associated with a second long term evolution release. For this embodiment, scheduling component 830 is configured to assign at least one of the first pair of physical resource blocks or the second pair of physical resource blocks to the first wireless terminal, and the at least one pair of distributed resource blocks to the second wireless terminal. To this end, it should be further noted that the disclosed aspects are not limited to multiplexing UEs utilizing common reference signals (CRS) with UEs utilizing either dedicated reference signals (DRS) or user equipment reference signals (UE-RS). For instance, in an aspect, a mix of Release8 DRS (mode 7) and CRS (modes 1-6) UEs are multiplexed with Release9+ UE-RS (mode 8 and beyond) UEs.

Meanwhile, output component 845 may be configured to output communications to external entities. For instance, output component 845 may be configured to communicate the minimum resource allocation granularity to wireless terminals in any of a plurality of ways. In a first aspect, output component 845 is configured to explicitly communicate the minimum resource allocation granularity to wireless terminals. In a second aspect, output component 845 is configured to communicate the minimum resource allocation granularity to wireless terminals according to a pre-defined rule.

As stated previously, the hopping pattern used by mapping component 815 may be communicated across cells participating in cooperative schemes so that a common hopping pattern is utilized by each participating cell. Accordingly, base station 800 may further include hopping pattern component 850, wherein hopping pattern component 850 is configured to facilitate a commonality between the hopping pattern used by mapping component 815 and an external hopping pattern associated with at least one external cell.

Figure 9:
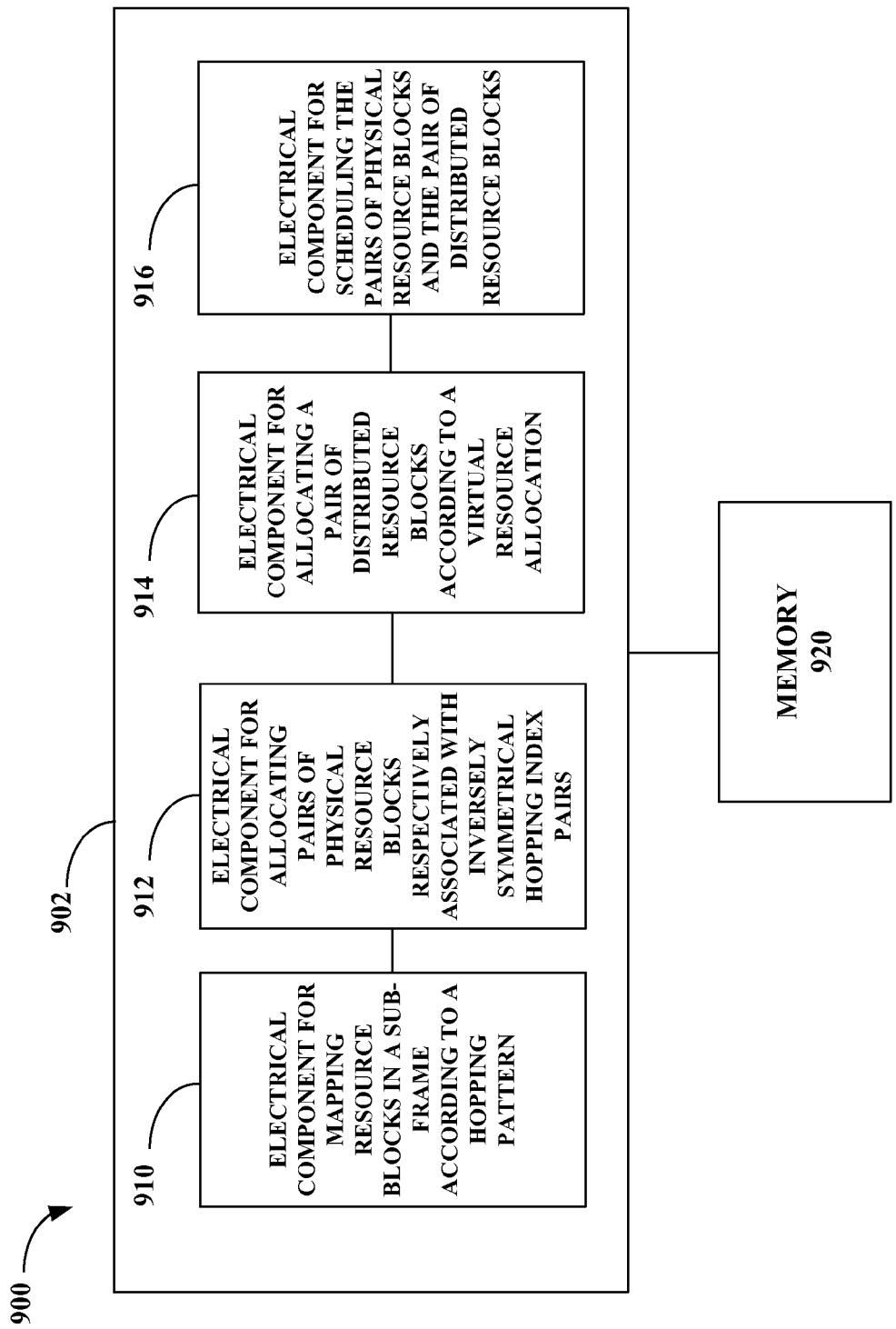
FIG. 9 is an illustration of an exemplary coupling of electrical components that effectuate multiplexing disparate wireless terminals according to an embodiment.

Referring next to FIG. 9, illustrated is a system 900 that facilitates multiplexing disparate wireless terminals according to an embodiment. System 900 can reside within a base station, for instance. System 900 includes functional blocks that can represent functions implemented by a processor, software, or combination thereof (e.g., firmware), wherein system 900 includes a logical grouping 902 of electrical components that can act in conjunction. As illustrated, logical grouping 902 can include an electrical component for mapping resource blocks in a sub-frame according to a hopping pattern 910, as well as an electrical component for allocating pairs of physical resource blocks respectively associated with inversely symmetrical hopping index pairs 912. Logical grouping 902 can also include an electrical component for allocating a pair of distributed resource blocks according to a virtual resource allocation 914. Further, logical grouping 902 can include an electrical component for scheduling the pairs of physical resource blocks and the pair of distributed resource blocks 916. Additionally, system 900 can include a memory 920 that retains instructions for executing functions associated with electrical components 910, 912, 914, and 916, wherein any of electrical components 910, 912, 914, and 916 can exist either within or outside memory 920.

Figure 10:
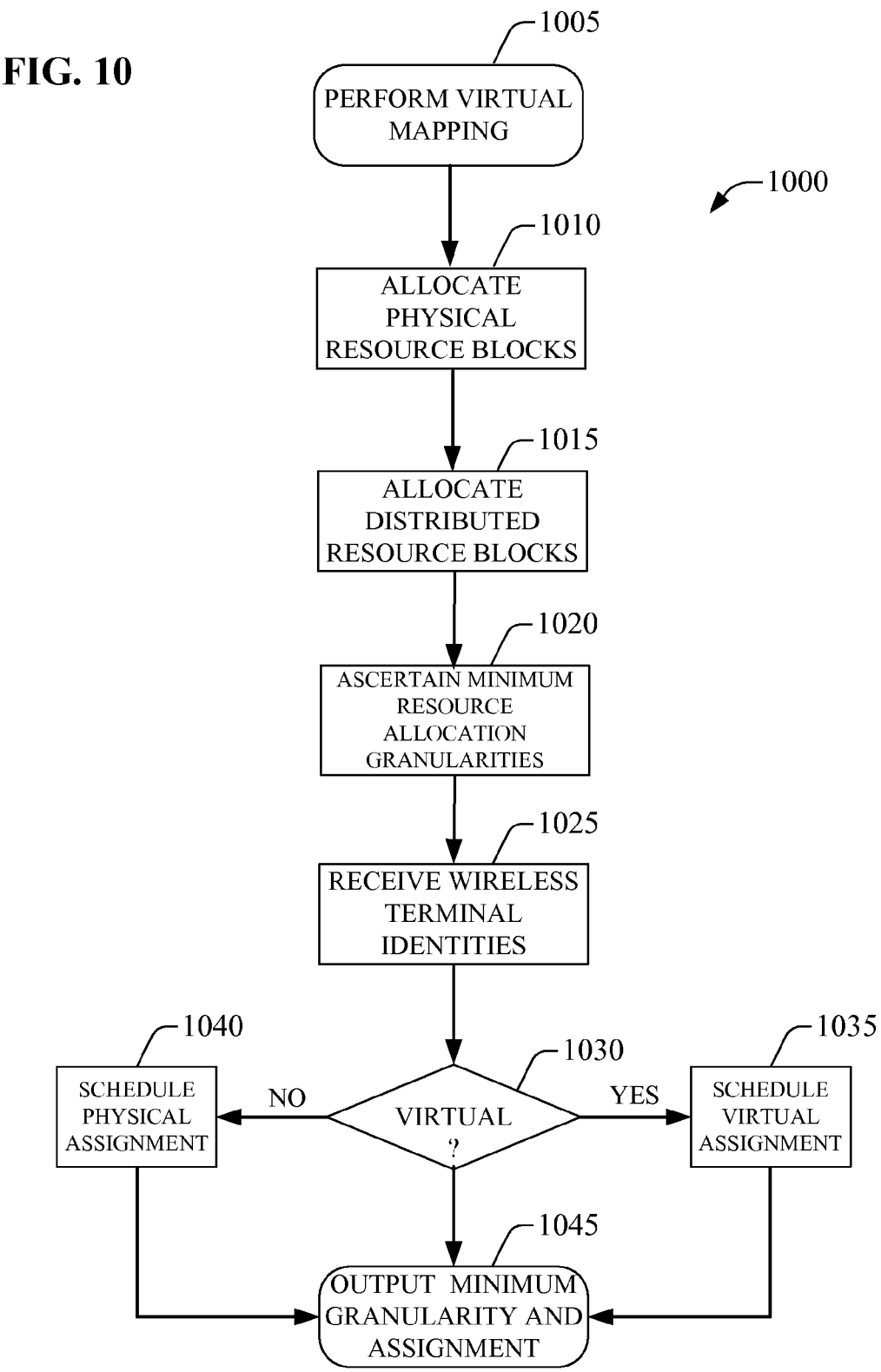
FIG. 10 is a flow chart illustrating an exemplary methodology for multiplexing disparate wireless terminals in accordance with an aspect of the subject specification.

Referring next to FIG. 10, a flow chart illustrating an exemplary method for multiplexing disparate wireless terminals is provided. As illustrated, process 1000 includes a series of acts that may be performed by a base station according to an aspect of the subject specification. For instance, process 1000 may be implemented by employing a processor to execute computer executable instructions stored on a computer readable storage medium to implement the series of acts. In another embodiment, a computer-readable storage medium comprising code for causing at least one computer to implement the acts of process 1000 are contemplated.

In an aspect, process 1000 begins with the base station performing a virtual mapping at act 1005, in which resource blocks are mapped in a sub-frame according to a hopping pattern associated with a virtual resource allocation. Within such embodiment, the sub-frame includes a first set of resource blocks in a first slot and second set of resource blocks in a second slot, wherein each of the first set of resource blocks has a hopping index associated with a corresponding hopping index in the second set of resource blocks. Here, as stated previously, a commonality may be facilitated between the hopping pattern and an external hopping pattern associated with at least one external cell.

Next, at act 1010, the base station proceeds to physically allocate physical resource blocks, wherein each of a first pair of physical resource blocks and a second pair of physical resource blocks are allocated according to a physical resource allocation. For this embodiment, the first pair of physical resource blocks is associated with a first hopping index pair, whereas the second pair of physical resource blocks is associated with a second hopping index pair. In an aspect, as stated previously, the first hopping index pair is inversely symmetrical with the second hopping index pair.

At act 1015, process 1000 proceeds to virtually allocate distributed resource blocks. Here, a pair of distributed resource blocks are allocated according to the aforementioned virtual resource allocation associated with the hopping pattern. For this embodiment, the pair of distributed resource blocks is different than each of the first pair of physical resource blocks and the second pair of physical resource blocks.

Minimum resource allocation granularities may then be ascertained at act 1020. In an aspect, process 1000 includes defining a first minimum resource allocation granularity corresponding to a first set of wireless terminals, as well as a second minimum resource allocation granularity different than the first minimum resource allocation granularity and corresponding to a second set of wireless terminals different than the first set of wireless terminals. Here, it should be noted that the minimum resource allocation granularities can be defined in any of a plurality of ways. For instance, minimum resource allocation granularities can be defined in either of a time domain or frequency domain, separately and/or jointly. Furthermore, the minimum resource allocation granularities can be defined as a function of a rank of transmission, a pre-defined physical resource block granularity, a type of reference signal, and/or a user equipment reference signal pattern.

Next, at act 1025, the identities of wireless terminals are received. Here, it should be noted that any of a plurality of types of identifying indicia can be received to facilitate identifying wireless terminals. In a particular embodiment, a first identifying indicia is received that facilitates identifying a first wireless terminal as utilizing a user equipment reference signal, and a second identifying indicia is received that facilitates identifying a second wireless terminal as utilizing a common reference signal.

Once the wireless terminals have been identified, the base station then determines, at act 1030, whether a virtual or physical scheduling is desired for each wireless terminal. In an aspect, this determination can be based on whether the particular wireless terminal utilizes a user equipment reference signal or a common reference signal. For example, wireless terminals utilizing a user equipment reference signal can be scheduled according to a physical resource allocation, whereas wireless terminals utilizing a common reference signal can be scheduled according to a virtual resource allocation.

If a virtual resource allocation is desired, process 1000 proceeds to act 1035 where a virtual assignment is scheduled. Otherwise, if a virtual resource allocation is not desired, process 1000 proceeds to act 1040 where a physical assignment is scheduled. Once the appropriate scheduling has been performed, process 1000 concludes at act 1045 where the base station outputs the appropriate minimum resource allocation granularity and resource assignment to each wireless terminal. Here, as stated previously, the minimum resource allocation granularity can be explicitly communicated to wireless terminals and/or communicated implicitly according to a pre-defined rule.

Figure 11:
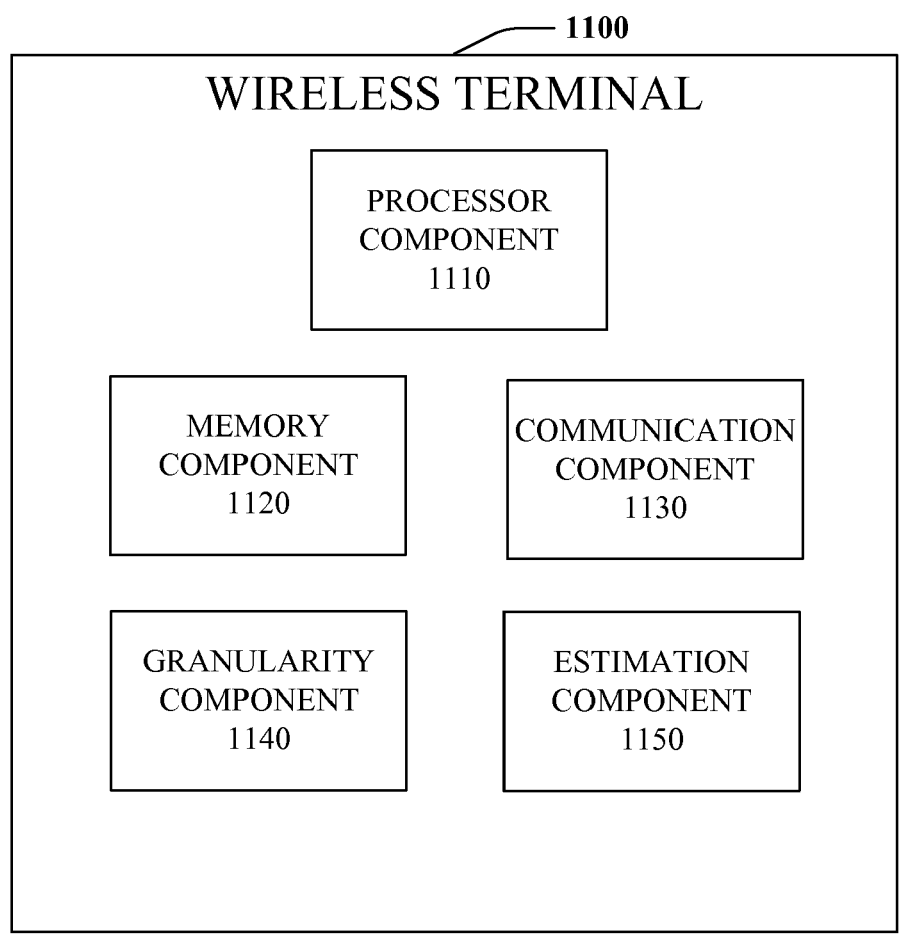
FIG. 11 illustrates a block diagram of an exemplary wireless terminal that facilitates operation of a wireless terminal according to a multiplexed scheduling of disparate wireless terminals.

Referring next to FIG. 11, a block diagram illustrates an exemplary wireless terminal in accordance with various aspects. As illustrated, wireless terminal 1100 may include processor component 1110, memory component 1120, communication component 1130, granularity component 1140, and estimation component 1150.

Similar to processor component 805 in base station 800, processor component 1110 is configured to execute computer-readable instructions related to performing any of a plurality of functions. Processor component 1110 can be a single processor or a plurality of processors dedicated to analyzing information to be communicated from wireless terminal 1100 and/or generating information that can be utilized by memory component 1120, communication component 1130, granularity component 1140, and/or estimation component 1150. Additionally or alternatively, processor component 1110 may be configured to control one or more components of wireless terminal 1100.

In another aspect, memory component 1120 is coupled to processor component 1110 and configured to store computer-readable instructions executed by processor component 1110. Memory component 1120 may also be configured to store any of a plurality of other types of data including data generated by any of communication component 1130, granularity component 1140, and/or estimation component 1150. Here, it should be noted that memory component 1120 is analogous to memory component 810 in base station 800. Accordingly, it should be appreciated that any of the aforementioned features/configurations of memory component 810 are also applicable to memory component 1120.

In yet another aspect, communication component 1130 is coupled to processor component 1110 and configured to interface wireless terminal 1100 with external entities. For instance, communication component 1130 may be configured to receive a communication from a base station that includes a resource allocation and a reference signal. The resource allocation and the reference signal may then be utilized by other components of wireless terminal 1100. In an aspect, the resource allocation is either a physical resource allocation or a virtual resource allocation. For physical resource allocations, the reference signal may be a user equipment reference signal, whereas for virtual resource allocations, the reference signal may be a common reference signal.

As illustrated, wireless terminal 1100 may also include granularity component 1140. Within such embodiment, granularity component 1140 is configured to ascertain a minimum resource allocation granularity associated with the resource allocation from the communication. Here, it should be noted that granularity component 1140 may be configured to ascertain the minimum resource allocation granularity in any of a plurality of ways. For instance, granularity component 1140 may be configured to ascertain the minimum resource allocation granularity in either of a time domain or frequency domain, separately and/or jointly. Granularity component 835 may also be configured to ascertain the minimum resource allocation granularity from an explicit communication received from the base station and/or according to a pre-defined rule.

Wireless terminal 1100 may also include estimation component 1150, which is configured to perform a joint channel estimation. In an aspect, estimation component 1150 is configured to perform the joint channel estimation based on the reference signal and as a function of the minimum resource allocation granularity.

Figure 12:
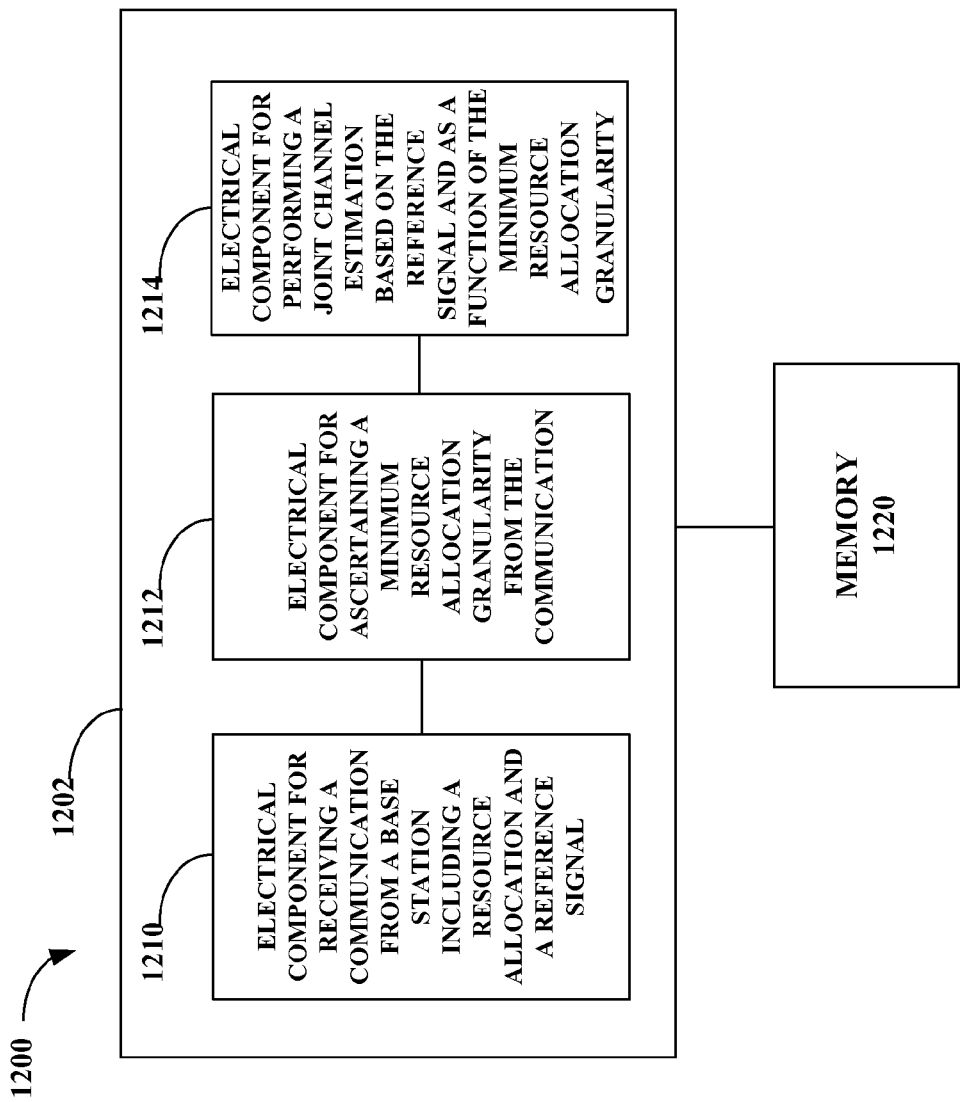
FIG. 12 is an illustration of an exemplary coupling of electrical components that effectuate operation of a wireless terminal according to a multiplexed scheduling of disparate wireless terminals.

Referring next to FIG. 12, illustrated is an exemplary system 1200 that facilitates operation of a wireless terminal according to a multiplexed scheduling of disparate wireless terminals. System 1200 and/or instructions for implementing system 1200 can physically reside within a femto cell or computer-readable storage medium, for instance, wherein system 1200 includes functional blocks that can represent functions implemented by a processor, software, or combination thereof (e.g., firmware). Moreover, system 1200 includes a logical grouping 1202 of electrical components that can act in conjunction similar to logical grouping 902 in system 900. As illustrated, logical grouping 1202 can include an electrical component for receiving a communication from a base station including a resource allocation and a reference signal 1210. Furthermore, logical grouping 1202 can include an electrical component for ascertaining a minimum resource allocation granularity from the communication 1212. Logical grouping 1202 can also include an electrical component for performing a joint channel estimation based on the reference signal and as a function of the minimum resource allocation granularity 1214. Additionally, system 1200 can include a memory 1220 that retains instructions for executing functions associated with electrical components 1210, 1212, and 1214. While shown as being external to memory 1220, it is to be understood that electrical components 1210, 1212, and 1214 can exist within memory 1220.

Figure 13:
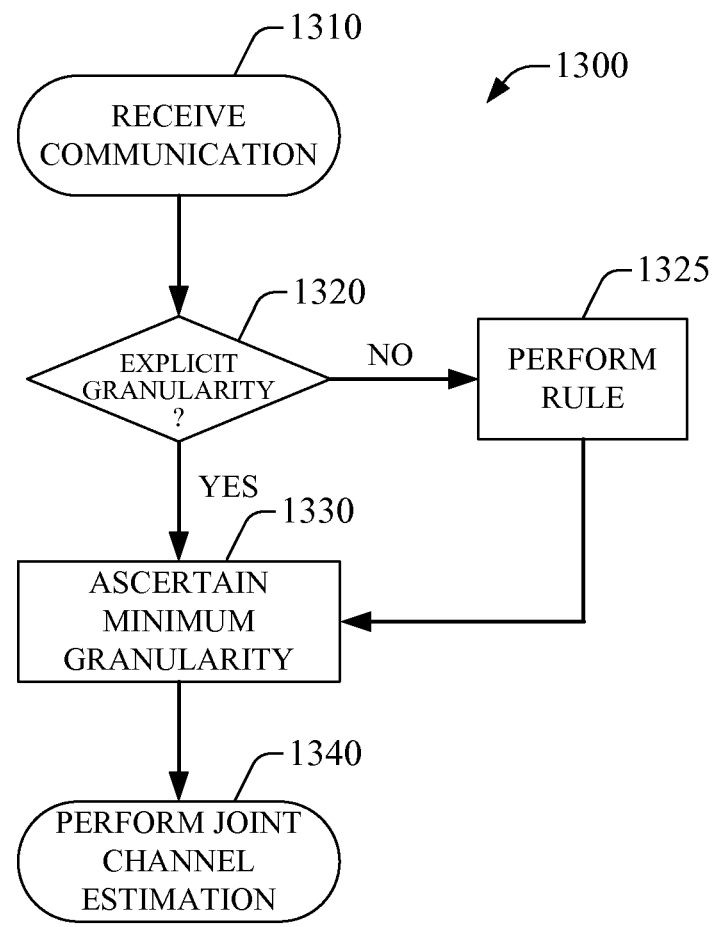
FIG. 13 is a flow chart illustrating an exemplary methodology for facilitating operation of a wireless terminal according to a multiplexed scheduling of disparate wireless terminals.

Referring next to FIG. 13, a flow chart illustrating an exemplary method for facilitating operation of a wireless terminal according to a multiplexed scheduling of disparate wireless terminals is provided. As illustrated, process 1300 includes a series of acts that may be performed by a wireless terminal according to an aspect of the subject specification. For instance, process 1300 may be implemented by employing a processor to execute computer executable instructions stored on a computer readable storage medium to implement the series of acts. In another embodiment, a computer-readable storage medium comprising code for causing at least one computer to implement the acts of process 1300 are contemplated.

In an aspect, process 1300 begins with the wireless terminal receiving a communication from a base station at act 1310 that includes a resource allocation and a reference signal. Next, at act 1320, the wireless terminal determines whether a minimum resource allocation granularity associated with the resource allocation has been explicitly provided. If the granularity is explicitly provided, the wireless terminal proceeds to act 1330 where the granularity is ascertained. Otherwise, if the granularity is not explicitly provided, process 1300 proceeds to act 1325 where a pre-defined rule is performed, which facilitates subsequently ascertaining the granularity at act 1330. Once the granularity has been ascertained, process 1300 concludes at act 1340 where a joint channel estimation is performed based on the reference signal and as a function of the minimum resource allocation granularity.

Exemplary Communication System

Figure 14:
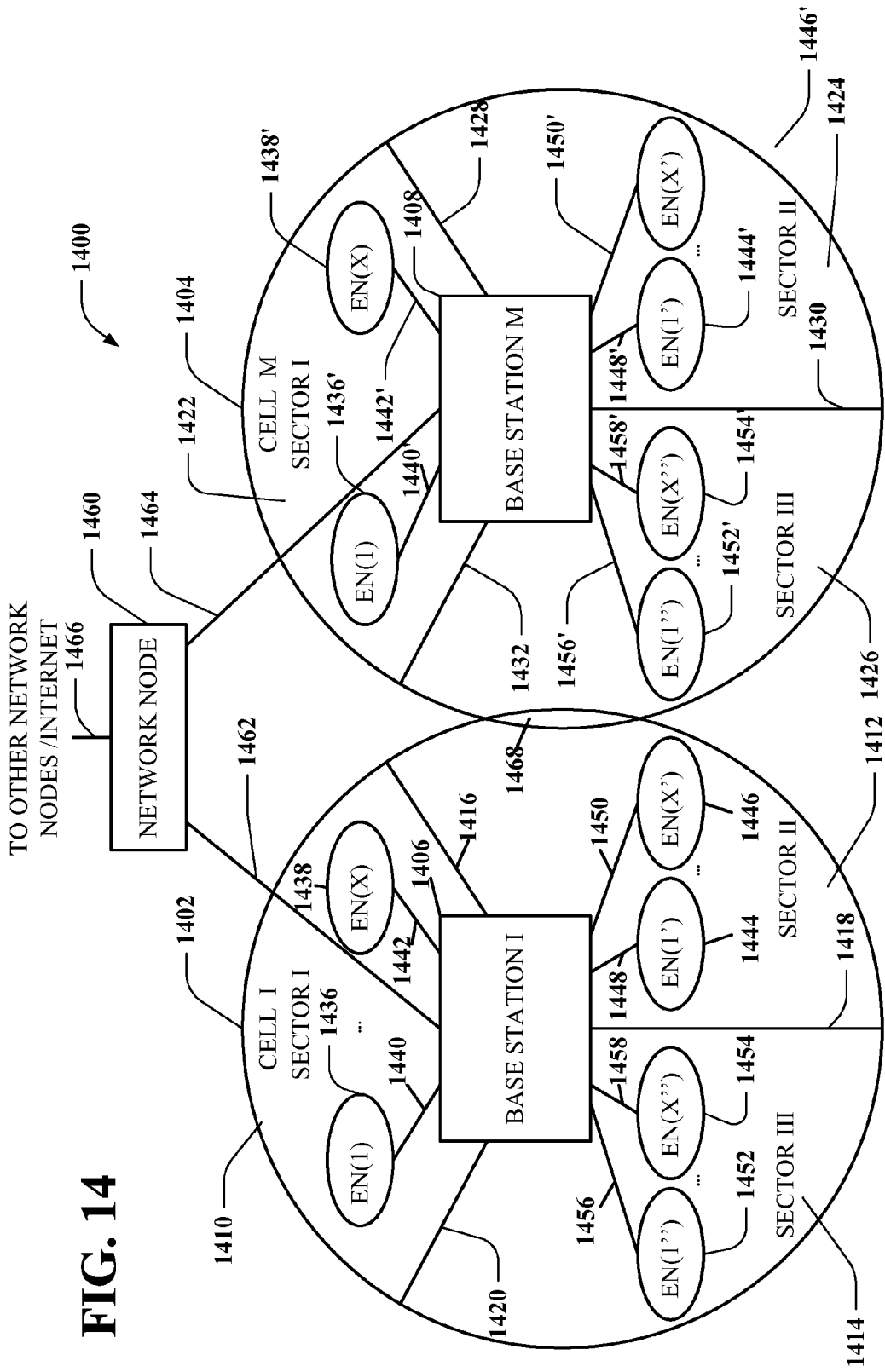
FIG. 14 is an illustration of an exemplary communication system implemented in accordance with various aspects including multiple cells.

Referring next to FIG. 14, an exemplary communication system 1400 implemented in accordance with various aspects is provided including multiple cells: cell 11402, cell M 1404. Here, it should be noted that neighboring cells 1402, 1404 overlap slightly, as indicated by cell boundary region 1468, thereby creating potential for signal interference between signals transmitted by base stations in neighboring cells. Each cell 1402, 1404 of system 1400 includes three sectors. Cells which have not been subdivided into multiple sectors (N=1), cells with two sectors (N=2) and cells with more than 3 sectors (N>3) are also possible in accordance with various aspects. Cell 1402 includes a first sector, sector I 1410, a second sector, sector II 1412, and a third sector, sector III 1414. Each sector 1410, 1412, and 1414 has two sector boundary regions; each boundary region is shared between two adjacent sectors.

Sector boundary regions provide potential for signal interference between signals transmitted by base stations in neighboring sectors. Line 1416 represents a sector boundary region between sector I 1410 and sector II 1412; line 1418 represents a sector boundary region between sector II 1412 and sector III 1414; line 1420 represents a sector boundary region between sector III 1414 and sector I 1410. Similarly, cell M 1404 includes a first sector, sector I 1422, a second sector, sector II 1424, and a third sector, sector III 1426. Line 1428 represents a sector boundary region between sector I 1422 and sector II 1424; line 1430 represents a sector boundary region between sector II 1424 and sector III 1426; line 1432 represents a boundary region between sector III 1426 and sector I 1422. Cell 11402 includes a base station (BS), base station I 1406, and a plurality of end nodes (ENs) in each sector 1410, 1412, 1414. Sector I 1410 includes EN(1) 1436 and EN(X) 1438 coupled to BS 1406 via wireless links 1440, 1442, respectively; sector II 1412 includes EN(1') 1444 and EN(X') 1446 coupled to BS 1406 via wireless links 1448, 1450, respectively; sector III 1414 includes EN(1") 1452 and EN(X") 1454 coupled to BS 1406 via wireless links 1456, 1458, respectively. Similarly, cell M 1404 includes base station M 1408, and a plurality of end nodes (ENs) in each sector 1422, 1424, and 1426. Sector 11422 includes EN(1) 1436' and EN(X) 1438' coupled to BS M 1408 via wireless links 1440', 1442', respectively; sector II 1424 includes EN(1') 1444' and EN(X') 1446' coupled to BS M 1408 via wireless links 1448', 1450', respectively; sector 3 1426 includes EN(1") 1452' and EN(X") 1454' coupled to BS 1408 via wireless links 1456', 1458', respectively.

System 1400 also includes a network node 1460 which is coupled to BS I 1406 and BS M 1408 via network links 1462, 1464, respectively. Network node 1460 is also coupled to other network nodes, e.g., other base stations, AAA server nodes, intermediate nodes, routers, etc. and the Internet via network link 1466. Network links 1462, 1464, 1466 may be, e.g., fiber optic cables. Each end node, e.g. EN 1 1436 may be a wireless terminal including a transmitter as well as a receiver. The wireless terminals, e.g., EN(1) 1436 may move through system 1400 and may communicate via wireless links with the base station in the cell in which the EN is currently located. The wireless terminals, (WTs), e.g. EN(1) 1436, may communicate with peer nodes, e.g., other WTs in system 1400 or outside system 1400 via a base station, e.g. BS 1406, and/or network node 1460. WTs, e.g., EN(1) 1436 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones. Although the subject system was described primarily within the context of cellular mode, it is to be appreciated that a plurality of modes may be available and employable in accordance with aspects described herein.

Exemplary Base Station

Figure 15:
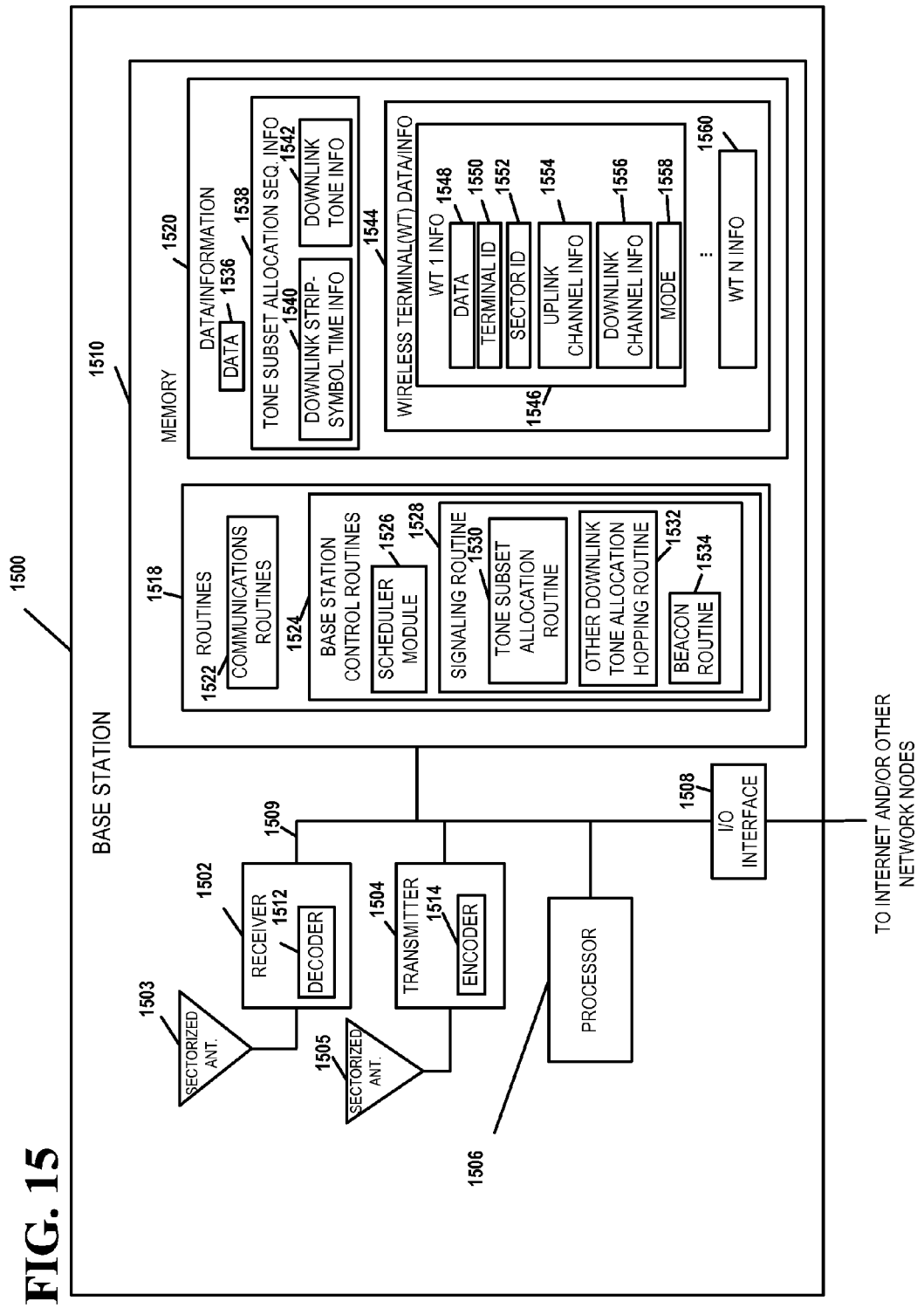
FIG. 15 is an illustration of an exemplary base station in accordance with various aspects described herein.

FIG. 15 illustrates an example base station 1500 in accordance with various aspects. Base station 1500 implements tone subset allocation sequences, with different tone subset allocation sequences generated for respective different sector types of the cell. Base station 1500 may be used as any one of base stations 1406, 1408 of the system 1400 of FIG. 14. The base station 1500 includes a receiver 1502, a transmitter 1504, a processor 1506, e.g., CPU, an input/output interface 1508 and memory 1510 coupled together by a bus 1509 over which various elements 1502, 1504, 1506, 1508, and 1510 may interchange data and information.

Sectorized antenna 1503 coupled to receiver 1502 is used for receiving data and other signals, e.g., channel reports, from wireless terminals transmissions from each sector within the base station's cell. Sectorized antenna 1505 coupled to transmitter 1504 is used for transmitting data and other signals, e.g., control signals, pilot signal, beacon signals, etc. to wireless terminals 1600 (see FIG. 16) within each sector of the base station's cell. In various aspects, base station 1500 may employ multiple receivers 1502 and multiple transmitters 1504, e.g., an individual receivers 1502 for each sector and an individual transmitter 1504 for each sector. Processor 1506, may be, e.g., a general purpose central processing unit (CPU). Processor 1506 controls operation of base station 1500 under direction of one or more routines 1518 stored in memory 1510 and implements the methods. I/O interface 1508 provides a connection to other network nodes, coupling the BS 1500 to other base stations, access routers, AAA server nodes, etc., other networks, and the Internet. Memory 1510 includes routines 1518 and data/information 1520.

Data/information 1520 includes data 1536, tone subset allocation sequence information 1538 including downlink strip-symbol time information 1540 and downlink tone information 1542, and wireless terminal (WT) data/info 1544 including a plurality of sets of WT information: WT 1 info 1546 and WT N info 1560. Each set of WT info, e.g., WT 1 info 1546 includes data 1548, terminal ID 1550, sector ID 1552, uplink channel information 1554, downlink channel information 1556, and mode information 1558.

Routines 1518 include communications routines 1522 and base station control routines 1524. Base station control routines 1524 includes a scheduler module 1526 and signaling routines 1528 including a tone subset allocation routine 1530 for strip-symbol periods, other downlink tone allocation hopping routine 1532 for the rest of symbol periods, e.g., non strip-symbol periods, and a beacon routine 1534.

Data 1536 includes data to be transmitted that will be sent to encoder 1514 of transmitter 1504 for encoding prior to transmission to WTs, and received data from WTs that has been processed through decoder 1512 of receiver 1502 following reception. Downlink strip-symbol time information 1540 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1542 includes information including a carrier frequency assigned to the base station 1500, the number and frequency of tones, and the set of tone subsets to be allocated to the strip-symbol periods, and other cell and sector specific values such as slope, slope index and sector type.

Data 1548 may include data that WT1 1600 has received from a peer node, data that WT 1 1600 desires to be transmitted to a peer node, and downlink channel quality report feedback information. Terminal ID 1550 is a base station 1500 assigned ID that identifies WT 1 1600. Sector ID 1552 includes information identifying the sector in which WT1 1600 is operating. Sector ID 1552 can be used, for example, to determine the sector type. Uplink channel information 1554 includes information identifying channel segments that have been allocated by scheduler 1526 for WT1 1600 to use, e.g., uplink traffic channel segments for data, dedicated uplink control channels for requests, power control, timing control, etc. Each uplink channel assigned to WT1 1600 includes one or more logical tones, each logical tone following an uplink hopping sequence. Downlink channel information 1556 includes information identifying channel segments that have been allocated by scheduler 1526 to carry data and/or information to WT1 1600, e.g., downlink traffic channel segments for user data. Each downlink channel assigned to WT1 1600 includes one or more logical tones, each following a downlink hopping sequence. Mode information 1558 includes information identifying the state of operation of WT1 1600, e.g. sleep, hold, on.

Communications routines 1522 control the base station 1500 to perform various communications operations and implement various communications protocols. Base station control routines 1524 are used to control the base station 1500 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1528 controls the operation of receiver 1502 with its decoder 1512 and transmitter 1504 with its encoder 1514. The signaling routine 1528 is responsible controlling the generation of transmitted data 1536 and control information. Tone subset allocation routine 1530 constructs the tone subset to be used in a strip-symbol period using the method of the aspect and using data/info 1520 including downlink strip-symbol time info 1540 and sector ID 1552. The downlink tone subset allocation sequences will be different for each sector type in a cell and different for adjacent cells. The WTs 1600 receive the signals in the strip-symbol periods in accordance with the downlink tone subset allocation sequences; the base station 1500 uses the same downlink tone subset allocation sequences in order to generate the transmitted signals. Other downlink tone allocation hopping routine 1532 constructs downlink tone hopping sequences, using information including downlink tone information 1542, and downlink channel information 1556, for the symbol periods other than the strip-symbol periods. The downlink data tone hopping sequences are synchronized across the sectors of a cell. Beacon routine 1534 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Exemplary Wireless Terminal

Figure 16:
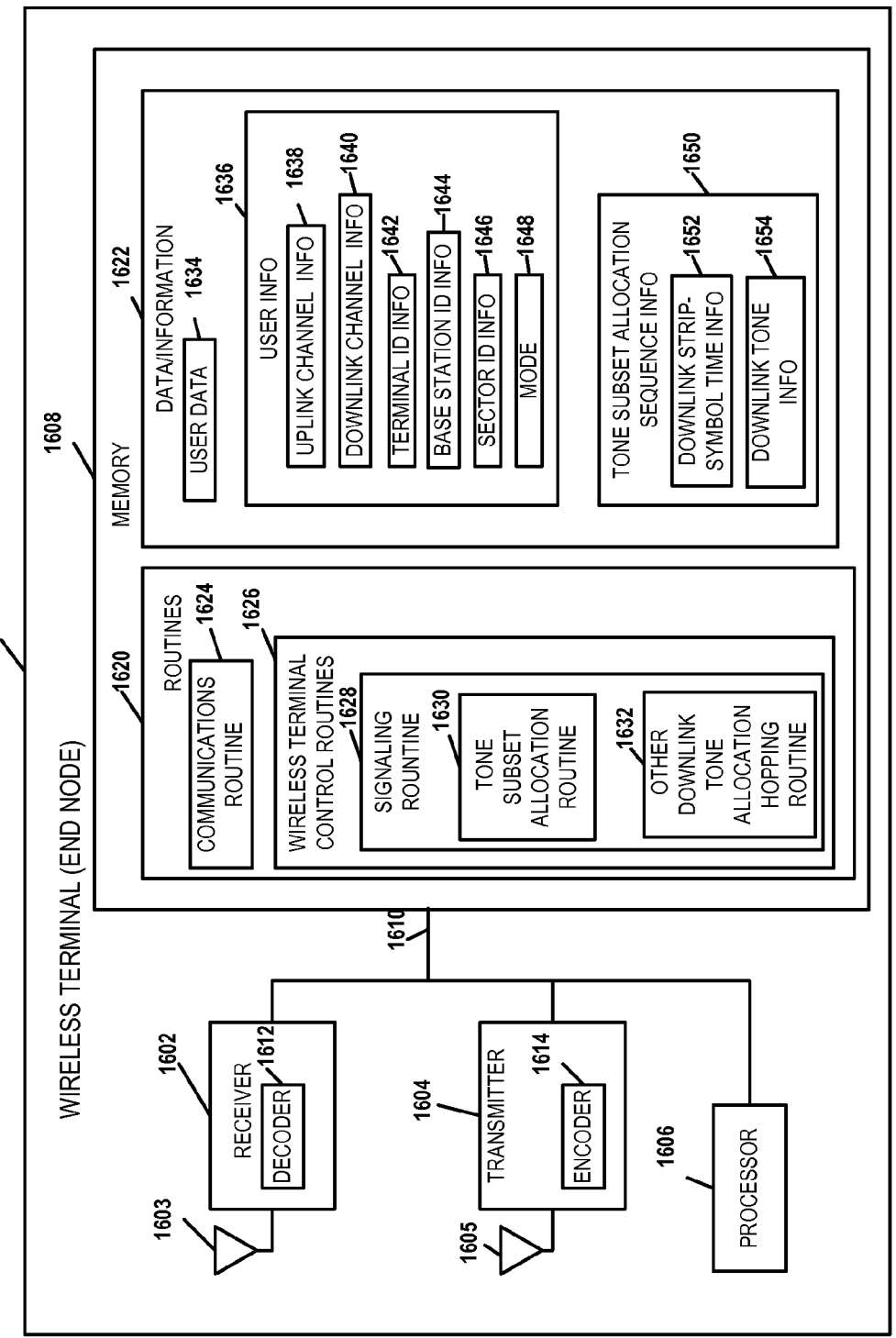
FIG. 16 is an illustration of an exemplary wireless terminal implemented in accordance with various aspects described herein.

FIG. 16 illustrates an example wireless terminal (end node) 1600 which can be used as any one of the wireless terminals (end nodes), e.g., EN(1) 1436, of the system 1400 shown in FIG. 14. Wireless terminal 1600 implements the tone subset allocation sequences. The wireless terminal 1600 includes a receiver 1602 including a decoder 1612, a transmitter 1604 including an encoder 1614, a processor 1606, and memory 1608 which are coupled together by a bus 1610 over which the various elements 1602, 1604, 1606, 1608 can interchange data and information. An antenna 1603 used for receiving signals from a base station (and/or a disparate wireless terminal) is coupled to receiver 1602. An antenna 1605 used for transmitting signals, e.g., to a base station (and/or a disparate wireless terminal) is coupled to transmitter 1604.

The processor 1606, e.g., a CPU controls the operation of the wireless terminal 1600 and implements methods by executing routines 1620 and using data/information 1622 in memory 1608.

Data/information 1622 includes user data 1634, user information 1636, and tone subset allocation sequence information 1650. User data 1634 may include data, intended for a peer node, which will be routed to encoder 1614 for encoding prior to transmission by transmitter 1604 to a base station, and data received from the base station which has been processed by the decoder 1612 in receiver 1602. User information 1636 includes uplink channel information 1638, downlink channel information 1640, terminal ID information 1642, base station ID information 1644, sector ID information 1646, and mode information 1648. Uplink channel information 1638 includes information identifying uplink channels segments that have been assigned by a base station for wireless terminal 1600 to use when transmitting to the base station. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1640 includes information identifying downlink channel segments that have been assigned by a base station to WT 1600 for use when the base station is transmitting data/information to WT 1600. Downlink channels may include downlink traffic channels and assignment channels, each downlink channel including one or more logical tone, each logical tone following a downlink hopping sequence, which is synchronized between each sector of the cell.

User info 1636 also includes terminal ID information 1642, which is a base station-assigned identification, base station ID information 1644 which identifies the specific base station that WT has established communications with, and sector ID info 1646 which identifies the specific sector of the cell where WT 1600 is presently located. Base station ID 1644 provides a cell slope value and sector ID info 1646 provides a sector index type; the cell slope value and sector index type may be used to derive tone hopping sequences. Mode information 1648 also included in user info 1636 identifies whether the WT 1600 is in sleep mode, hold mode, or on mode.

Tone subset allocation sequence information 1650 includes downlink strip-symbol time information 1652 and downlink tone information 1654. Downlink strip-symbol time information 1652 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1654 includes information including a carrier frequency assigned to the base station, the number and frequency of tones, and the set of tone subsets to be allocated to the strip-symbol periods, and other cell and sector specific values such as slope, slope index and sector type.

Routines 1620 include communications routines 1624 and wireless terminal control routines 1626. Communications routines 1624 control the various communications protocols used by WT 1600. Wireless terminal control routines 1626 controls basic wireless terminal 1600 functionality including the control of the receiver 1602 and transmitter 1604. Wireless terminal control routines 1626 include the signaling routine 1628. The signaling routine 1628 includes a tone subset allocation routine 1630 for the strip-symbol periods and an other downlink tone allocation hopping routine 1632 for the rest of symbol periods, e.g., non strip-symbol periods. Tone subset allocation routine 1630 uses user data/info 1622 including downlink channel information 1640, base station ID info 1644, e.g., slope index and sector type, and downlink tone information 1654 in order to generate the downlink tone subset allocation sequences in accordance with some aspects and process received data transmitted from the base station. Other downlink tone allocation hopping routine 1630 constructs downlink tone hopping sequences, using information including downlink tone information 1654, and downlink channel information 1640, for the symbol periods other than the strip-symbol periods. Tone subset allocation routine 1630, when executed by processor 1606, is used to determine when and on which tones the wireless terminal 1600 is to receive one or more strip-symbol signals from the base station 1500. The uplink tone allocation hopping routine 1630 uses a tone subset allocation function, along with information received from the base station, to determine the tones in which it should transmit on.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

When the embodiments are implemented in program code or code segments, it should be appreciated that a code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc. Additionally, in some aspects, the steps and/or actions of a method or algorithm can reside as one or any combination or set of codes and/or instructions on a machine readable medium and/or computer readable medium, which can be incorporated into a computer program product.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, as used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

What is claimed is:

1. A method that facilitates multiplexing disparate wireless terminals, the method comprising:
    mapping resource blocks in a sub-frame according to a hopping pattern, the sub-frame including a first set of resource blocks in a first slot and second set of resource blocks in a second slot, wherein each of the first set of resource blocks has a hopping index associated with a corresponding hopping index in the second set of resource blocks;
    allocating each of a first pair of physical resource blocks and a second pair of physical resource blocks according to a physical resource allocation, the first pair of physical resource blocks associated with a first hopping index pair, the second pair of physical resource blocks associated with a second hopping index pair, wherein the first hopping index pair is inversely symmetrical with the second hopping index pair;
    allocating a pair of distributed resource blocks according to a virtual resource allocation associated with the hopping pattern, wherein the pair of distributed resource blocks is different than each of the first pair of physical resource blocks and the second pair of physical resource blocks; and
    scheduling an assignment, wherein the scheduling includes assigning each of the first pair of physical resource blocks and the second pair of physical resource blocks according to the physical resource allocation, and wherein the scheduling includes assigning the pair of distributed resource blocks according to the virtual resource allocation.

2. The method of claim 1, further comprising identifying each of a first wireless terminal and a second wireless terminal, the first wireless terminal identified as utilizing a user equipment reference signal, the second wireless terminal identified as utilizing a common reference signal, wherein at least one of the first pair of physical resource blocks or the second pair of physical resource blocks is assigned to the first wireless terminal, and wherein the pair of distributed resource blocks is assigned to the second wireless terminal.

3. The method of claim 1, further comprising defining a minimum resource allocation granularity.

4. The method of claim 3, the defining comprising defining each of a first minimum resource allocation granularity and a second minimum resource allocation granularity, the first minimum resource allocation granularity corresponding to a first set of wireless terminals, the second minimum resource allocation granularity different than the first minimum resource allocation granularity and corresponding to a second set of wireless terminals different than the first set of wireless terminals.

5. The method of claim 3, the defining comprising defining the minimum resource allocation granularity in at least one of a time domain or a frequency domain.

6. The method of claim 5, the defining comprising defining the minimum resource allocation granularity jointly in the time domain and the frequency domain.

7. The method of claim 3, wherein the defining is a function of at least one of a rank of transmission, a pre-defined physical resource block granularity, a type of reference signal, or a user equipment reference signal pattern.

8. The method of claim 3, further comprising explicitly communicating the minimum resource allocation granularity to a wireless terminal.

9. The method of claim 3, further comprising communicating the minimum resource allocation granularity to a wireless terminal according to a pre-defined rule.

10. The method of claim 1, further comprising facilitating a commonality between the hopping pattern and an external hopping pattern associated with at least one external cell.

11. An apparatus configured to facilitate multiplexing disparate wireless terminals, the apparatus comprising:
a processor configured to:
map resource blocks in a sub-frame according to a hopping pattern, the sub-frame including a first set of resource blocks in a first slot and second set of resource blocks in a second slot, wherein each of the first set of resource blocks has a hopping index associated with a corresponding hopping index in the second set of resource blocks;
allocate each of a first pair of physical resource blocks and a second pair of physical resource blocks according to a physical resource allocation, the first pair of physical resource blocks associated with a first hopping index pair, the second pair of physical resource blocks associated with a second hopping index pair, wherein the first hopping index pair is inversely symmetrical with the second hopping index pair;
allocate a pair of distributed resource blocks according to a virtual resource allocation associated with the hopping pattern, wherein the pair of distributed resource blocks is different than each of the first pair of physical resource blocks and the second pair of physical resource blocks; and
schedule an assignment, wherein the scheduling includes assigning each of the first pair of physical resource blocks and the second pair of physical resource blocks according to the physical resource allocation, and wherein the scheduling includes assigning the pair of distributed resource blocks according to the virtual resource allocation; and
memory coupled to the processor.

12. The apparatus of claim 11, wherein the processor is further configured to:
identify each of a first wireless terminal and a second wireless terminal, the first wireless terminal identified as utilizing a user equipment reference signal, the second wireless terminal identified as utilizing a common reference signal;
assign at least one of the first pair of physical resource blocks or the second pair of physical resource blocks to the first wireless terminal; and
assign the pair of distributed resource blocks to the second wireless terminal.

13. The apparatus of claim 11, wherein the processor is further configured to define a minimum resource allocation granularity.

14. The apparatus of claim 13, wherein the processor is further configured to define each of a first minimum resource allocation granularity and a second minimum resource allocation granularity, the first minimum resource allocation granularity corresponding to a first set of wireless terminals, the second minimum resource allocation granularity different than the first minimum resource allocation granularity and corresponding to a second set of wireless terminals different than the first set of wireless terminals.

15. The apparatus of claim 13, wherein the processor is further configured to define the minimum resource allocation granularity in at least one of a time domain or a frequency domain.

16. The apparatus of claim 15, wherein the processor is further configured to define the minimum resource allocation granularity jointly in the time domain and the frequency domain.

17. The apparatus of claim 13, wherein the processor is further configured to define the minimum resource allocation granularity as a function of at least one of a rank of transmission, a pre-defined physical resource block granularity, a type of reference signal, or a user equipment reference signal pattern.

18. The apparatus of claim 13, wherein the processor is further configured to explicitly communicate the minimum resource allocation granularity to a wireless terminal.

19. The apparatus of claim 13, wherein the processor is further configured to communicate the minimum resource allocation granularity to a wireless terminal according to a pre-defined rule.

20. The apparatus of claim 11, wherein the processor is further configured to facilitate a commonality between the hopping pattern and an external hopping pattern associated with at least one external cell.

21. A computer program product that facilitates multiplexing disparate wireless terminals, comprising:
a non-transitory computer-readable storage medium comprising code for causing at least one computer to:
map resource blocks in a sub-frame according to a hopping pattern, the sub-frame including a first set of resource blocks in a first slot and second set of resource blocks in a second slot, wherein each of the first set of resource blocks has a hopping index associated with a corresponding hopping index in the second set of resource blocks;

physically allocate each of a first pair of physical resource blocks and a second pair of physical resource blocks according to a physical resource allocation, the first pair of physical resource blocks associated with a first hopping index pair, the second pair of physical resource blocks associated with a second hopping index pair, wherein the first hopping index pair is inversely symmetrical with the second hopping index pair;

virtually allocate a pair of distributed resource blocks according to a virtual resource allocation associated with the hopping pattern, wherein the pair of distributed resource blocks is different than each of the first pair of physical resource blocks and the second pair of physical resource blocks; and schedule an assignment, wherein the assignment includes assigning each of the first pair of physical resource blocks and the second pair of physical resource blocks according to the physical resource allocation, and wherein the assignment includes assigning the pair of distributed resource blocks according to the virtual resource allocation.

22. The computer program product of claim 21, the code further causing the at least one computer to identify each of a first wireless terminal and a second wireless terminal, the first wireless terminal associated with a first long term evolution release, the second wireless terminal associated with a second long term evolution release, wherein at least one of the first pair of physical resource blocks or the second pair of physical resource blocks is assigned to the first wireless terminal, and wherein the pair of distributed resource blocks is assigned to the second wireless terminal.

23. The computer program product of claim 21, the code further causing the at least one computer to define a minimum resource allocation granularity.

24. The computer program product of claim 21, the code further causing the at least one computer to facilitate a commonality between the hopping pattern and an external hopping pattern associated with at least one external cell.

25. An apparatus configured to facilitate multiplexing disparate wireless terminals, the apparatus comprising:

means for mapping resource blocks in a sub-frame according to a hopping pattern, the sub-frame including a first set of resource blocks in a first slot and second set of resource blocks in a second slot, wherein each of the first set of resource blocks has a hopping index associated with a corresponding hopping index in the second set of resource blocks;

means for physically allocating each of a first pair of physical resource blocks and a second pair of physical resource blocks according to a physical resource allocation, the first pair of physical resource blocks associated with a first hopping index pair, the second pair of physical resource blocks associated with a second hopping index pair, wherein the first hopping index pair is inversely symmetrical with the second hopping index pair;

means for virtually allocating a pair of distributed resource blocks according to a virtual resource allocation associated with the hopping pattern, wherein the pair of distributed resource blocks is different than each of the first pair of physical resource blocks and the second pair of physical resource blocks; and means for scheduling an assignment, wherein the scheduling includes assigning each of the first pair of physical resource blocks and the second pair of physical resource blocks according to the physical resource allocation, and wherein the scheduling includes assigning the pair of distributed resource blocks according to the virtual resource allocation.

26. The apparatus of claim 25, wherein each of a first wireless terminal and a second wireless terminal are identified, the first wireless terminal associated with a first long term evolution release, the second wireless terminal associated with a second long term evolution release, wherein at least one of the first pair of physical resource blocks or the second pair of physical resource blocks is assigned to the first wireless terminal, and wherein the pair of distributed resource blocks is assigned to the second wireless terminal.

27. The apparatus of claim 25, wherein a minimum resource allocation granularity is defined.

28. The apparatus of claim 25, wherein a commonality is facilitated between the hopping pattern and an external hopping pattern associated with at least one external cell.

29. A method that facilitates operation of a wireless terminal according to a multiplexed scheduling of disparate wireless terminals, the method comprising:

receiving a communication from a base station, the communication including a resource allocation and a reference signal;

ascertaining a minimum resource allocation granularity from the communication, wherein the minimum resource allocation granularity is associated with the resource allocation; and performing a joint channel estimation based on the reference signal, wherein the joint channel estimation is a function of the minimum resource allocation granularity.

30. The method of claim 29, wherein the resource allocation is a physical resource allocation, and wherein the reference signal is a user equipment reference signal.

31. The method of claim 29, wherein the resource allocation is a virtual resource allocation, and wherein the reference signal is a common reference signal.

32. The method of claim 29, the ascertaining comprising ascertaining the minimum resource allocation granularity in at least one of a time domain or a frequency domain.

33. The method of claim 32, the ascertaining comprising ascertaining the minimum resource allocation granularity jointly in the time domain and the frequency domain.

34. The method of claim 29, the ascertaining comprising ascertaining the minimum resource allocation granularity from an explicit communication received from the base station.

35. The method of claim 29, the ascertaining comprising ascertaining the minimum resource allocation granularity according to a pre-defined rule.

36. An apparatus configured to facilitate operation of a wireless terminal according to a multiplexed scheduling of disparate wireless terminals, the apparatus comprising:

a processor configured to:
receive a communication from a base station, the communication including a resource allocation and a reference signal;
ascertain a minimum resource allocation granularity from the communication, wherein the minimum resource allocation granularity is associated with the resource allocation; and
perform a joint channel estimation based on the reference signal, wherein the joint channel estimation is performed as a function of the minimum resource allocation granularity; and memory coupled to the processor.

37. The apparatus of claim 36, wherein the resource allocation is a physical resource allocation, and wherein the reference signal is a user equipment reference signal.

38. The apparatus of claim 36, wherein the resource allocation is a virtual resource allocation, and wherein the reference signal is a common reference signal.

39. The apparatus of claim 36, wherein the processor is further configured to ascertain the minimum resource allocation granularity in at least one of a time domain or a frequency domain.

40. The apparatus of claim 39, wherein the processor is further configured to jointly ascertain the minimum resource allocation granularity in the time domain and the frequency domain.

41. The apparatus of claim 36, wherein the processor is further configured to ascertain the minimum resource allocation granularity from an explicit communication received from the base station.

42. The apparatus of claim 36, wherein the processor is further configured to ascertain the minimum resource allocation granularity according to a pre-defined rule.

43. A computer program product that facilitates operation of a wireless terminal according to a multiplexed scheduling of disparate wireless terminals, comprising:
a non-transitory computer-readable storage medium comprising code for causing at least one computer to:
receive a communication from a base station, the communication including a resource allocation and a reference signal;
ascertain a minimum resource allocation granularity from the communication, wherein the minimum resource allocation granularity is associated with the resource allocation; and
perform a joint channel estimation based on the reference signal, wherein the joint channel estimation is a function of the minimum resource allocation granularity.

44. The computer program product of claim 43, wherein the code to ascertain comprises code to ascertain minimum resource allocation granularity in at least one of a time domain or a frequency domain.

45. The computer program product of claim 43, wherein the code to ascertain comprises code to ascertain minimum resource allocation granularity from an explicit communication received from the base station.

46. An apparatus configured to facilitate operation of a wireless terminal according to a multiplexed scheduling of disparate wireless terminals, the apparatus comprising:
means for receiving a communication from a base station, the communication including a resource allocation and a reference signal;
means for ascertaining a minimum resource allocation granularity from the communication, wherein the minimum resource allocation granularity is associated with the resource allocation; and
means for performing a joint channel estimation based on the reference signal, wherein the joint channel estimation is a function of the minimum resource allocation granularity.

47. The apparatus of claim 46, the means for ascertaining the minimum resource allocation granularity configured to ascertain the minimum resource allocation granularity jointly in a time domain and a frequency domain.

48. The apparatus of claim 46, the means for ascertaining the minimum resource allocation granularity configured to ascertain the minimum resource allocation granularity according to a pre-defined rule.

* * * * *